(12) United States Patent
Brandt et al.

(10) Patent No.: US 6,377,993 B1
(45) Date of Patent: Apr. 23, 2002

(54) INTEGRATED PROXY INTERFACE FOR WEB BASED DATA MANAGEMENT REPORTS

(75) Inventors: Andre R. Brandt; Sajan J. Pillai, both of Colorado Springs, CO (US)

(73) Assignee: MCI WorldCom, Inc., Jackson, MS (US)

( * ) Notice: Subject to any disclaimer, the term of this patent is extended or adjusted under 35 U.S.C. 154(b) by 0 days.

(21) Appl. No.: 09/159,684

(22) Filed: Sep. 24, 1998

Related U.S. Application Data

(60) Provisional application No. 60/060,655, filed on Sep. 26, 1997.

(51) Int. Cl.[7] .............................................. G06F 13/00
(52) U.S. Cl. ........................................ 709/227; 709/223
(58) Field of Search ................................ 709/200, 227, 709/223

(56) References Cited

U.S. PATENT DOCUMENTS

| | | |
|---|---|---|
| 4,160,129 A | 7/1979 | Peyser et al. |
| 4,345,315 A | 8/1982 | Cadotte et al. |
| 4,817,050 A | 3/1989 | Komatsu et al. |
| 4,893,248 A | 1/1990 | Pitts et al. |
| 4,972,504 A | 11/1990 | Daniel, Jr. et al. |
| 5,041,972 A | 8/1991 | Frost |
| 5,075,771 A | 12/1991 | Hashimoto |
| 5,131,020 A | 7/1992 | Liebesny et al. |
| 5,228,076 A | 7/1993 | Hopner et al. |
| 5,245,533 A | 9/1993 | Marshall |
| 5,285,494 A | 2/1994 | Sprecher et al. |
| 5,287,270 A | 2/1994 | Hardy et al. |
| 5,315,093 A | 5/1994 | Stewart |
| 5,325,290 A | 6/1994 | Cauffman et al. |
| 5,327,486 A | 7/1994 | Wolff et al. |
| 5,369,571 A | 11/1994 | Metts |
| 5,452,446 A | 9/1995 | Johnson |

(List continued on next page.)

FOREIGN PATENT DOCUMENTS

| | | |
|---|---|---|
| EP | 0 809 387 A2 | 5/1997 |
| WO | WO 97/16911 | 5/1997 |
| WO | WO 97/23988 | 7/1997 |
| WO | WO 98/19472 | 5/1998 |
| WO | WO 99/01826 | 1/1999 |

OTHER PUBLICATIONS

Chapman, D. Brent et al., "Building Internet Firewalls", Nov. 1995, O'Reilly & Associates, p. 58.

He, Taniguchi, "Internet Traffic Control and Management Architecture", IEEE, Oct. 22–24, 1998, pp. s46–03–1–s46–03–5.

(List continued on next page.)

*Primary Examiner*—David Wiley

(57) ABSTRACT

An Intranet/Internet/Web-based data management tool that provides a common GUI enabling the requesting, customizing, scheduling and viewing of various types of priced call detail data reports pertaining to a customer's usage of telecommunications services. The Web-based reporting system tool comprises a novel Web-based, client-server application integrated with an operational data management/storage infrastructure that enables customers to access their own relevant data information timely, rapidly and accurately through the GUI client interface. The data management system infrastructure is designed to enable the secure initiation, acquisition, and presentation of telecommunications priced call detail data reports to customer workstations implementing a web browser.

21 Claims, 20 Drawing Sheets

U.S. PATENT DOCUMENTS

| | | |
|---|---|---|
| 5,475,836 A | 12/1995 | Harris et al. |
| 5,481,542 A | 1/1996 | Logston et al. |
| 5,483,596 A | 1/1996 | Rosenow et al. |
| 5,490,060 A | 2/1996 | Malec et al. |
| 5,491,779 A | 2/1996 | Bezjian |
| 5,526,257 A | 6/1996 | Lerner |
| 5,530,744 A | 6/1996 | Charalambous et al. |
| 5,537,611 A | 7/1996 | Rajagopal et al. |
| 5,548,726 A | 8/1996 | Pettus |
| 5,551,025 A | 8/1996 | O'Reilly et al. |
| 5,563,805 A | 10/1996 | Arbuckle et al. |
| 5,566,351 A | 10/1996 | Crittenden et al. |
| 5,602,918 A | 2/1997 | Chen et al. |
| 5,610,915 A | 3/1997 | Elliott et al. |
| 5,621,727 A | 4/1997 | Vaudreuil |
| 5,623,601 A | 4/1997 | Vu |
| 5,630,066 A | 5/1997 | Gosling |
| 5,649,182 A | 7/1997 | Reitz |
| 5,666,481 A | 9/1997 | Lewis |
| 5,671,354 A | 9/1997 | Ito et al. |
| 5,689,645 A | 11/1997 | Schettler et al. |
| 5,692,030 A | 11/1997 | Teglovic et al. |
| 5,692,181 A | 11/1997 | Anand et al. |
| 5,696,906 A | 12/1997 | Peters et al. |
| 5,699,403 A | 12/1997 | Ronnen |
| 5,699,528 A | 12/1997 | Hogan |
| 5,706,502 A | 1/1998 | Foley et al. |
| 5,708,780 A | 1/1998 | Levergood et al. |
| 5,721,908 A | 2/1998 | Lagarde et al. |
| 5,721,913 A | 2/1998 | Ackroff et al. |
| 5,727,129 A | 3/1998 | Barrett et al. |
| 5,734,709 A | 3/1998 | DeWitt et al. |
| 5,734,831 A | 3/1998 | Sanders |
| 5,742,762 A | 4/1998 | Scholl et al. |
| 5,742,763 A | 4/1998 | Jones |
| 5,742,768 A | 4/1998 | Gennaro et al. |
| 5,742,905 A | 4/1998 | Pepe et al. |
| 5,745,754 A | 4/1998 | Lagarde et al. |
| 5,754,830 A | 5/1998 | Butts et al. |
| 5,764,756 A | 6/1998 | Onweller |
| 5,768,501 A | 6/1998 | Lewis |
| 5,774,660 A | 6/1998 | Brendel et al. |
| 5,778,178 A | 7/1998 | Arunachalam |
| 5,778,377 A | 7/1998 | Marlin et al. |
| 5,781,550 A | 7/1998 | Templin et al. |
| 5,781,632 A | 7/1998 | Odom |
| 5,787,160 A | 7/1998 | Chaney et al. |
| 5,787,412 A | 7/1998 | Bosch et al. |
| 5,790,780 A | 8/1998 | Brichta et al. |
| 5,790,789 A | 8/1998 | Suarez |
| 5,790,797 A | 8/1998 | Shimada et al. |
| 5,790,809 A | 8/1998 | Holmes |
| 5,793,762 A | 8/1998 | Penners et al. |
| 5,793,964 A | 8/1998 | Rogers et al. |
| 5,796,393 A | 8/1998 | MacNaughton et al. |
| 5,799,154 A | 8/1998 | Kuriyan |
| 5,802,320 A | 9/1998 | Baehr et al. |
| 5,805,803 A | 9/1998 | Birrell et al. |
| 5,812,533 A | 9/1998 | Cox et al. |
| 5,812,654 A | 9/1998 | Anderson et al. |
| 5,812,750 A | 9/1998 | Dev et al. |
| 5,815,080 A | 9/1998 | Taguchi |
| 5,815,665 A | 9/1998 | Teper et al. |
| 5,819,225 A | 10/1998 | Eastwood et al. |
| 5,819,271 A | 10/1998 | Mahoney et al. |
| 5,825,769 A | 10/1998 | O'Reilly et al. |
| 5,826,029 A | 10/1998 | Gore, Jr. et al. |
| 5,826,269 A | 10/1998 | Hussey |
| 5,835,084 A | 11/1998 | Bailey et al. |
| 5,844,896 A | 12/1998 | Marks et al. |
| 5,845,067 A | 12/1998 | Porter et al. |
| 5,845,267 A | 12/1998 | Ronen |
| 5,848,396 A | 12/1998 | Gerace |
| 5,850,517 A | 12/1998 | Verkler et al. |
| 5,852,810 A | 12/1998 | Sotiroff et al. |
| 5,852,812 A | 12/1998 | Reeder |
| 5,862,325 A | 1/1999 | Reed et al. |
| 5,870,558 A | 2/1999 | Branton, Jr. et al. |
| 5,877,759 A | 3/1999 | Bauer |
| 5,884,032 A * | 3/1999 | Bateman et al. ............ 709/204 |
| 5,892,900 A | 4/1999 | Ginter et al. |
| 5,907,681 A | 5/1999 | Bates et al. |
| 5,909,679 A | 6/1999 | Hall |
| 5,909,682 A | 6/1999 | Cowan et al. |
| 5,915,001 A | 6/1999 | Uppaluru |
| 5,920,542 A | 7/1999 | Henderson |
| 5,923,016 A | 7/1999 | Fredregill et al. |
| 5,930,764 A | 7/1999 | Melchione et al. |
| 5,930,804 A | 7/1999 | Yu et al. |
| 5,958,016 A | 9/1999 | Chang et al. |
| 5,961,602 A | 10/1999 | Thompson et al. |
| 5,963,925 A | 10/1999 | Kolling et al. |
| 5,966,695 A | 10/1999 | Melchione et al. |
| 5,970,467 A | 10/1999 | Alavi |
| 5,974,396 A | 10/1999 | Anderson et al. |
| 5,974,441 A | 10/1999 | Rogers et al. |
| 5,982,891 A | 11/1999 | Ginter et al. |
| 5,991,733 A | 11/1999 | Aleia et al. |
| 5,991,806 A | 11/1999 | McHann, Jr. |
| 5,999,972 A | 12/1999 | Gish |
| 5,999,973 A * | 12/1999 | Glitho et al. ................ 709/223 |
| 6,011,844 A | 1/2000 | Uppaluru et al. |
| 6,014,647 A * | 1/2000 | Nizzari et al. ................. 705/39 |
| 6,014,702 A | 1/2000 | King et al. |
| 6,023,762 A | 2/2000 | Dean et al. |
| 6,031,904 A | 2/2000 | An et al. |
| 6,032,132 A | 2/2000 | Nelson |
| 6,032,184 A | 2/2000 | Cogger et al. |
| 6,041,325 A | 3/2000 | Shah et al. |
| 6,044,144 A | 3/2000 | Becker et al. |
| 6,049,602 A | 4/2000 | Foladare et al. |
| 6,049,789 A | 4/2000 | Smorodinsky |
| 6,058,381 A | 5/2000 | Nelson |
| 6,064,667 A | 5/2000 | Gisby et al. |
| 6,065,002 A | 5/2000 | Knotts et al. |
| 6,065,059 A | 5/2000 | Shieh et al. |
| 6,073,105 A | 6/2000 | Sutcliffe et al. |
| 6,073,241 A | 6/2000 | Rosenberg et al. |
| 6,078,891 A | 6/2000 | Riordan et al. |
| 6,078,924 A | 6/2000 | Ainsbury et al. |
| 6,085,171 A | 7/2000 | Leonard |
| 6,085,190 A | 7/2000 | Sakata |
| 6,091,808 A | 7/2000 | Wood et al. |
| 6,094,655 A | 7/2000 | Rogers et al. |
| 6,115,040 A | 9/2000 | Bladow et al. |
| 6,115,458 A | 9/2000 | Taskett |
| 6,115,693 A | 9/2000 | McDonough et al. |
| 6,115,737 A | 9/2000 | Ely et al. |
| 6,119,109 A | 9/2000 | Muratani et al. |
| 6,128,624 A | 10/2000 | Papierniak et al. |
| 6,131,095 A | 10/2000 | Low et al. |
| 6,134,584 A | 10/2000 | Chang et al. |
| 6,137,869 A | 10/2000 | Voit et al. |
| 6,145,001 A | 11/2000 | Scholl et al. |
| 5,982,864 A | 12/2000 | Jagadish et al. |
| 6,161,128 A | 12/2000 | Smyk |
| 6,212,506 B1 | 4/2001 | Shah et al. |
| 6,212,558 B1 | 4/2001 | Antur et al. |
| 6,253,239 B1 | 6/2001 | Shklar et al. |

OTHER PUBLICATIONS

"New software platform enhances network management capabilities . . . ", *Business Wire*, Sep. 28, 1995 p. 9281122.

"User's Guide: Microsoft Access", Microsoft Corporation, 1994, pp. 378,594,599, 630–632, (13).

Jainschigg, J., "Billing confirmed: this easy–to–use box turns guest calls into revenue." *Teleconnect*, vol. 12, No. 9, p. 39 (4).

Sixth International Conference on Network Protocols, IEEE, Technical Communication Services, Oct. 13–16, 1998, Table of Contents.

Markovich, Robert, "WAN Service Level Management Could Keep Your Feet Out of the Fire, Ensure Carriers Dilligence", Network World, Jul. 7, 1997.

Shklar, L., et al., "MetaMagic: Generating Virtual Web Sites Through Data Modeling," http://www.scope.gmd.de/info/www6/posters/714/poster714.html.

Vizard, M. et al., "MCI to Pilot Convergence Billing Service", *InfoWorld*, v. 18, Issue 37, Sep. 9, 1996.

Yager, T., "Mixed Messages", *UNIX Review*, v. 16, n. 2, p. 29, Feb. 1998.

"Carriers Improve Net Management Services", *Communications Week*, May 2, 1994, p. 74.

"Network management; new software platform enhances network management capabilities; MCI ServiceView offers greater cost savings, increased flexibility.", Product Announcement, *Edge*, Oct. 2, 1995, on & about AT&T, v. 10, n. 375, p. 11(1).

Biggs, M., "Help for the Web enhances customer support, reduces help desk load" *Inforworld*, Jun. 16, 1997, v. 19, No. 24, pp. 82+.

Burch, B., "AT&T, MCI to release new management tools", *Network World*, Jan. 17, 1994, p. 19.

Low, C., "Integrating Communication Services", *IEEE Communication Magazine*, Jun. 1997, pp. 164–169.

"McAfee's New 'Self–Service' Help Desk Web Suite Makes PCs Help Desk–Ready", Newswire Association Inc., Oct. 13, 1997.

Niemeyer, R., "Using Web Technologies in Two MLS Environments: A Security Analysis." *IEEE*, pp. 205–214, 1997.

Porter, T., "MCI offers tracking system: Direct Dispatch lets users eye problems remotely", *Service News*, Apr. 1994, p. 17.

*Computer Networks*, Andrew S. Tanenbaum, pp. 410–412.

"XIIR6.3 (Broadway) Overview", http://www.x.org/broadway.htm.

"Stac Unveils Windows NT 4.0 and Web Browser Support in New ReachOut 7" http://www.stac.com/news/pressrel/pr_ro7_unveil.html.

* cited by examiner

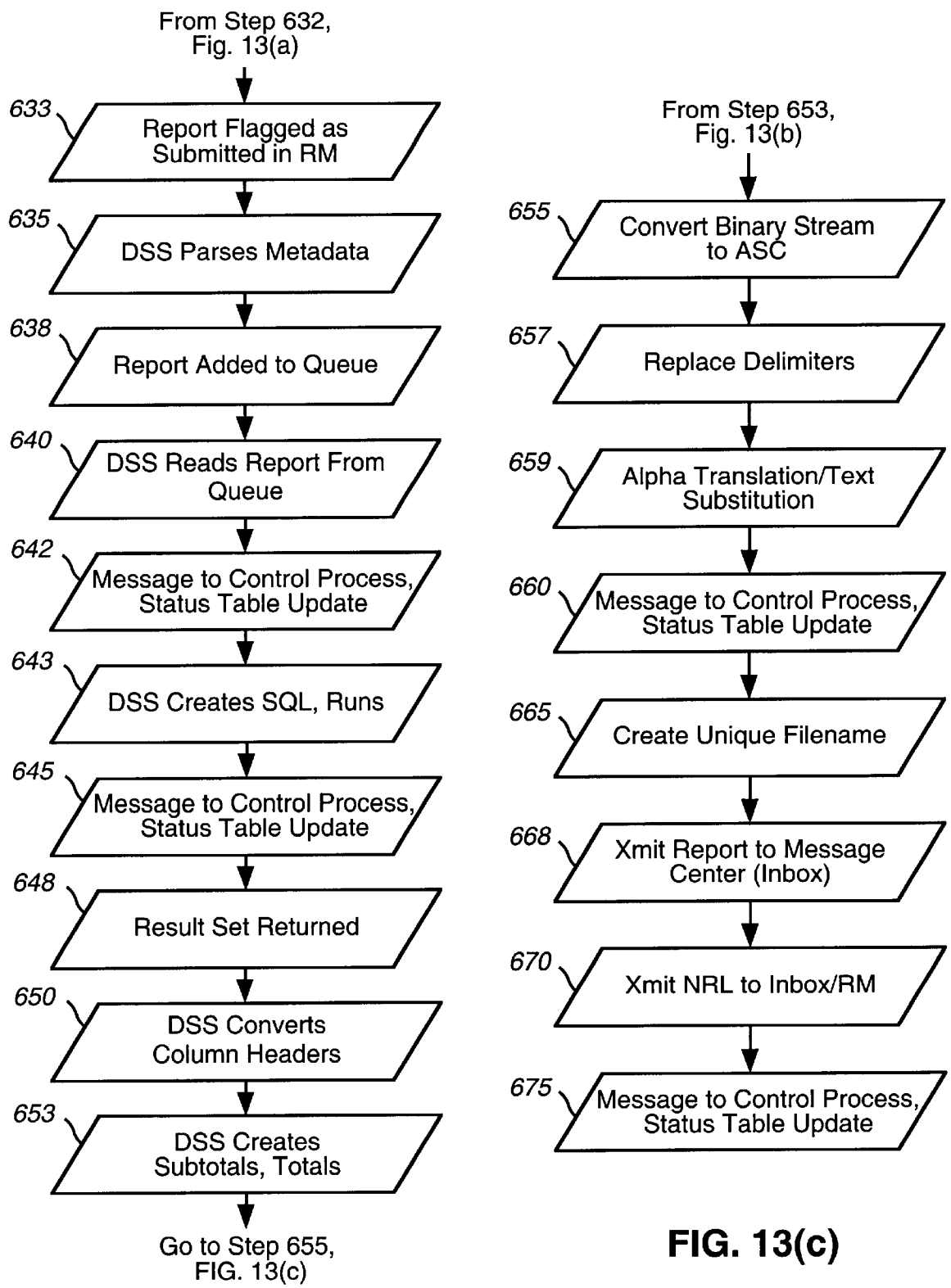

US 6,377,993 B1

INTEGRATED PROXY INTERFACE FOR WEB BASED DATA MANAGEMENT REPORTS

CROSS-REFERENCE TO RELATED APPLICATIONS

The following patent application is based on and claims the benefit of U.S. Provisional Patent Application Ser. No. 60/060,655, filed Sep. 26, 1997.

FIELD OF THE INVENTION

The present invention relates generally to information delivery systems and, particularly, to a novel, World Wide Web/Internet-based, telecommunications network data management reporting and presentation service for customers of telecommunications service entities.

BACKGROUND OF THE INVENTION

Telecommunications service entities, e.g., MCI, AT&T, Sprint, and the like, presently provide for the presentation and dissemination of customer account and network data management information to their customers predominantly by enabling customers (clients) to directly dial-up, e.g., via a modem, to the entity's application servers to access their account information, or, alternately, via dedicated communication lines, e.g., ISDN, T-1, etc., enabling account information requests to be initiated through their computer terminal running, for example, a Windows®-based graphical user interface. The requests are processed by the entity's application servers, which retrieves the requested customer information, e.g., from one or more databases, processes and formats the information for downloading to the client's computer terminal.

Some types of data, e.g., "priced" call detail data pertaining to a customer's telecommunications number usage, is made available for customers in an aggregated or processed form and provided to customers, e.g., on a monthly basis. This type of data is analyzed to determine, for example, asset usage and trend information necessary, which is required for network managers to make critical business decisions. As an example, the assignee telecommunications carrier MCI Corporation provides an MCI ServiceView ("MSV") product line for its business customers which includes several client-server based data management applications. One of these applications, referred to as "Perspective", provides call usage and analysis information that focuses on the presentation of and priced call detail data and reports from an MCI Perspective Data Server ("StarPR"). Another client-server based data management application, referred to as "Traffic View", focuses on the presentation of real time call detail data and network traffic analysis/monitor information as provided from an MCI Traffic view server. Particularly, with respect to MCI's Perspective system, customers are provided with their monthly priced and discounted raw call detail data, call detail aggregates, and statistical historical summary data. As such, the Perspective architecture is organized primarily as a batch midrange-based server data delivery mechanism with the data being typically delivered on a monthly basis, allowing for "delayed" trending, call pattern analysis, repricing and invoice validation based on the customer's call detail data. The trending, analysis, and repricing functionality is maintained in workstation-based software provided to customers for installation at customer sites on their PCS.

FIG. 1 illustrates the current architecture 10 for Perspective and Traffic View Systems which presently run on separate environments and are maintained independently of each other. The StarPR server provides a batch reporting mechanism focused primarily on providing billing data to 1-800/8xx, VNET, Vision, and other MCI customers and is used by MCI customers predominantly to do internal charge backs and to analyze billing usage. Alternately, or in addition, the customers use the data provided to them to do call traffic analysis, similar to TVS.

With specific reference to FIG. 1, the data collected is in the form of call detail records which are created by various MCI/Concert switches (not shown) whenever a telephone call is attempted in the MCI network and which includes information about call type, call origination and termination locations, date and time, added intelligent network services, any hop information, product type and other relevant information about the call. The Network Information Concentrator ("NIC") component 15 is a network element that collects the CDRs and sends them to appropriate locations via a Global Statistical Engine 17. The Global Statistical Engine 17 collects the CDRs and transforms, processes, and sends them to the TVS 20. The TVS provides access to this data through various statistical reports and real time monitoring engine 22 ("RTM").

The CDRs from are also sent to the billing system which applied billing based on call detail values. These "priced" CDRs are known as Billing Detail Records ("BDRs") and are sent to a Perspective Host ("Phost") server 25. The Phost server 25 filters out the BDRs not pertaining to the "Perspective" customers, applies various transformations to the customer's raw call detail data to generate summary data, and generates and formats the data for the various Perspective customers. This data is then compressed, sent to a document service center ("DSC") and CD-ROM dispatcher ("CDD") 34 entities which respectively, uncompresses the data and burns CD-ROMs comprising the customer's raw call detail data and summary data, in addition to reference files and possibly application software (if not previously owned) enabling customers to perform analysis and trending of their Perspective data. These CD-ROMs are sent to the customers, usually on a billing cycle or monthly basis, who view their data through a Perspective workstation-based software application residing on that customer's CPE, e.g., PC or workstation 36.

As shown in FIG. 1, the existing Perspective Host 25 mainframe-based data delivery system interfaces with all Perspective upstream feed systems, including billing systems and order entry, and processes the data, e.g., creates canned aggregates, for delivery to the document service center.

The following upstream feed systems include: 1) order entry information from a customer order entry system 19 ("CORE") and which information is used by the Perspective Host to determine what customer data to process and where to send it; 2) VNET and Vision monthly billing data feeds from a commercial billing system ("NBCS") system 23; 3) a Toll-free monthly billing data feed from a T/F database feed 27; and, a Concert Virtual Network Services ("CVNS") product feed from a CVNS database 31. In order for all the CDR and data feed information to be processed by the Phost server 25, various reference files and processing rules are provided including: alphanumeric translation reference files from the NCBS billing system 23 and an NPA/NXX-state-city and country code lookup reference file originating from a calling area data base ("CADB") 35.

While effective for its purpose, the current data management and presentation architecture only provides customers with their priced call detail data on a monthly basis, usually in the form of a canned report. This is not sufficient for an increasing number of customers who, to remain competitive, are required to have updated and real-time access to their data to enable them to make their critical business decisions quicker. Moreover, there are a variety of independent data management tools and legacy reporting systems having disparate systems and infrastructures providing little or no cross application interoperability and data sharing, thus, requiring customers to use separate applications to gain access to their data.

Furthermore, existing telecommunications service provider reporting systems are limited in that reports generated are of a narrow view, and are delivered at predetermined times with predetermined formats. These prior art reporting systems do not enable the generation of ad-hoc reports. Moreover, legacy platforms including reporting data are reaching the architectural limits of scalability in terms of the total customers they can support, total online data they can present, total historical data they can keep and type and number of applications they can support.

It would thus be highly desirable to provide a data management product that is a Web-based (Internet and IIntranet) client-server application providing priced call detail data information to customers in a variety of detailed report formats comprising specific customer account information.

It would additionally be highly desirable to provide a Web-based (Internet and IIntranet) data management tool having a unique back-end infrastructure for a Web-based client-server application which provides expedient and secure data access and reporting services to customers at any time, from any web browser on any computer terminal anywhere in the world.

SUMMARY OF THE INVENTION

The present invention is directed to a novel IIntranet/Internet/Web-based data management tool that provides a common GUI enabling the requesting, customizing, scheduling and viewing of various types of priced call detail data reports pertaining to a customer's usage of telecommunications services. The Intranet/Internet/Web-based reporting system tool comprises a novel Web-based, client-server application integrated with an operational data management/storage infrastructure that enables customers to access their own relevant data information timely, rapidly and accurately through the GUI client interface. The operational database system infrastructure particularly is configured to meet a customer's real-time data processing and storage requirements and is easy to deploy and manage, and further, ensures upward and downward scalability. It enables effective storage of data from a variety of independently developed legacy systems and, is readily integrated into a novel Web-based (Internet and Intranet) reporting system tool that enables customers to customize and directly access their own relevant data report information. The world wide web/Internet-based client-server data management and reporting tool employs a platform-independent, i.e., JAVA-based, network centric GUI client presentation layer and an objects/dispatcher/proxy layer access architecture.

Particularly, the telecommunications data management/system architecture is integrated with a novel Web/Internet based reporting system, referred to as networkMCI Interact ("nMCI"), described in co-pending U.S. patent application Ser. No. 09/159,409. The back-end data management/system architecture, referred to herein as "StarODS", implements a Data Warehouse approach to maintaining data obtained from upstream billing systems, i.e., priced call detail data, and which data may be made readily available for reporting on a daily basis. In this approach, priced call detail data is maintained in datamarts and operational data stores capable of meeting real-time processing and storage requirements. Particularly, these datamarts may be partitioned based on various criteria, e.g., customer id, to enable easier management of data by providing scalability, and enabling more control of over hardware and software resources, in a cost-effective way. Included in this datamart approach is a back-end server component provided to receive data access requests from various users in the form of a report request, interactive data analysis request or data mining request. This server routes the query to the appropriate data marts, data warehouse or operational data store and responds to the requestor with the result set.

The nMCI Interact system is a layer functioning to enable customers to request reporting functionality across the Internet. This report request functionality includes routing requests to appropriate datamarts, e.g., real-time reporting requests will be satisfied by real-time database. Additionally, the interface provides customers with the ability to schedule and prioritize reports, format report request result sets, and provides for load balancing, report request validation, query generation and execution. Through a common GUI, customers are enabled to access their own metered data, i.e., Perspective or usage analysis data.

In accordance with the principles of the present invention, there is provided a Web/Internet based reporting system for communicating data information from an enterprise intranet database to a client terminal via an integrated interface comprising: a client browser application located at the client terminal for enabling interactive Web based communications with the reporting system, the client terminal identified with a customer and providing the integrated interface; at least one secure server for managing client sessions over the Internet, the secure server supporting a first secure socket connection enabling encrypted communication between the browser application client and the secure server; a dispatch server for communicating with the secure server through a firewall over a second socket connection, the first secure and second sockets forming a secure communications link, the dispatch server enabling forwarding of a report request message and an associated report response message back to the client browser over the secure communications link; a report manager server for maintaining an inventory of reporting items associated with a customer and managing the reporting of customer-specific data information in accordance with a customer request message, the report manager accessing reporting items based on a customer identity and report name from a first database, and generating a response message including a metadata description of the reporting items; and, decision support server interfacing with the report manager for accessing the customer-specific data from the enterprise intranet database in accordance with the customer identity and report name, wherein the retrieved data and the metadata description of the reporting item are utilized to generate a completed report for presentation to the customer via the interface.

Advantageously, the novel Web/Internet based reporting system integrated with the data management system permits use of existing hardware while allowing future growth to utilize new equipment at less cost and further, allows for incremental expansion as applications and database capacities grow.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which:

FIGS. 13(a)–13(c) illustrate the end-to-end process 600 for fulfilling priced report request;

DETAILED DESCRIPTION OF THE INVENTION

The present invention is one component of an integrated suite of customer network management and report applications using a Web browser paradigm. Known as the networkMCI Interact system ("nMCI Interact") such an integrated suite of Web-based applications provides an invaluable tool for enabling customers to manage their telecommunication assets, quickly and securely, from anywhere in the world.

As described in co-pending U.S. patent application Ser. No. 09/159,695, the nMCI Interact system architecture is basically organized as a set of common components comprising the following:

1) an object-oriented software architecture detailing the client and server based aspect of nMCI Interact;

2) a network architecture defining the physical network needed to satisfy the security and data volume requirements of the networkMCI System;

3) a data architecture detailing the application, back-end or legacy data sources available for networkMCI Interact; and 4) an infrastructure covering security, order entry, fulfillment, billing, self-monitoring, metrics and support.

Each of these common component areas will be generally discussed hereinbelow. A detailed descriptions of each of these components can be found in a related, co-pending U.S. patent application Ser. No. 09/159,695, entitled INTEGRATED CUSTOMER INTERFACE SYSTEM FOR COMMUNICATIONS NETWORK MANAGEMENT, the disclosure of which is incorporated herein by reference thereto.

Figure 1:
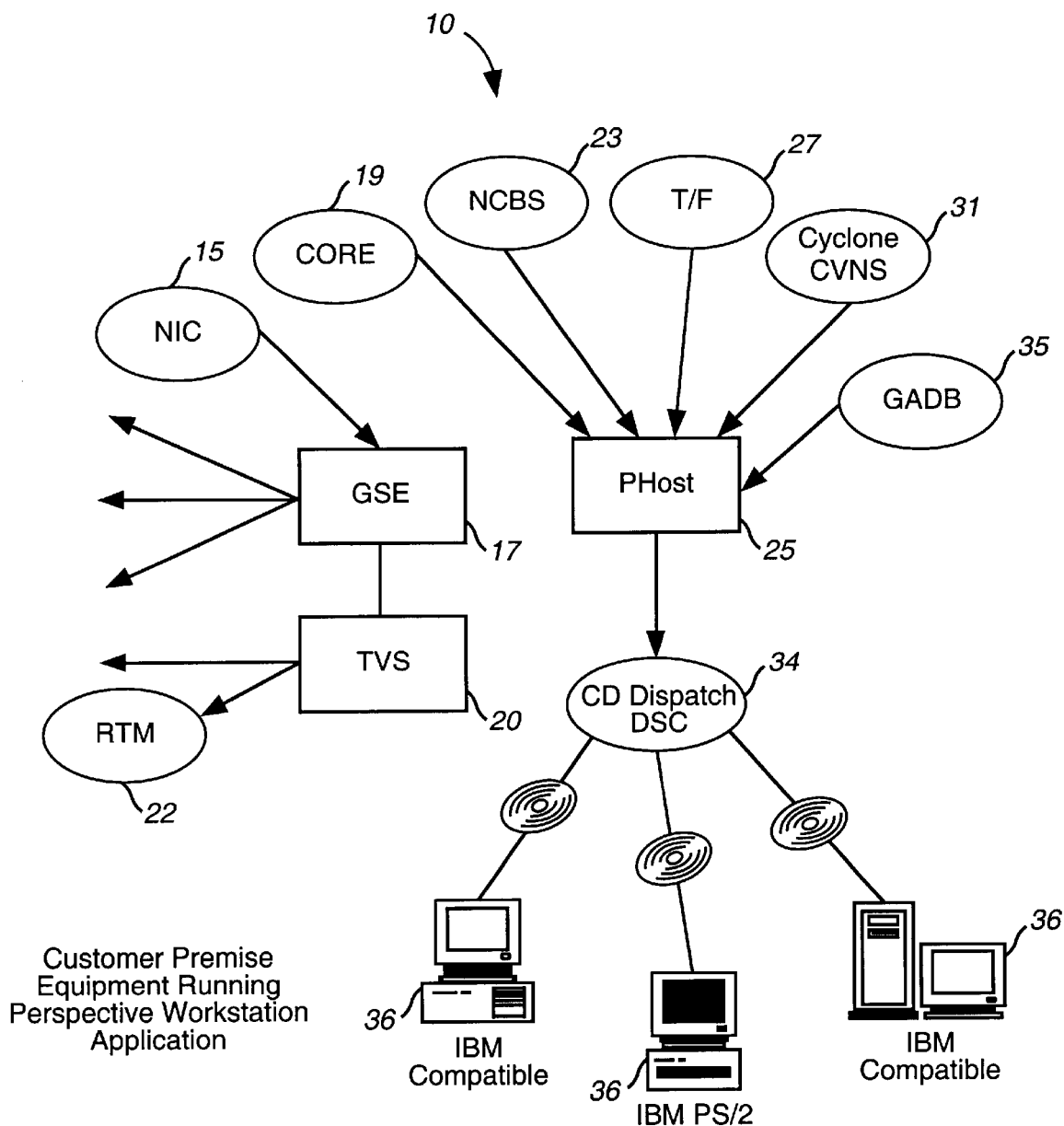
FIG. 1 illustrates conceptually an existing mainframe-based data delivery system 10 providing customer's call detail data.
Figure 2:
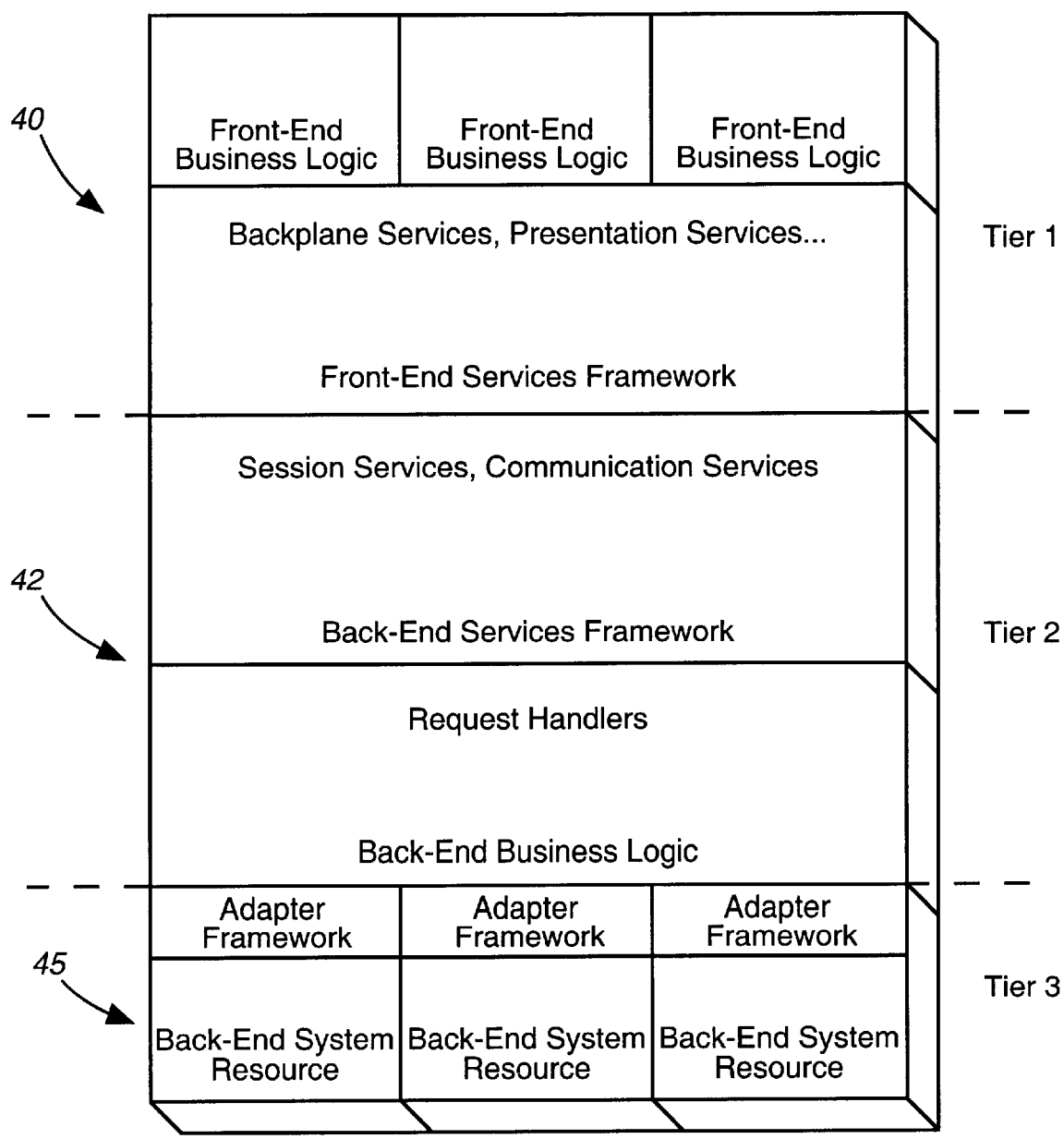
FIG. 2 illustrates the software architecture component comprising a three-tiered structure.

FIG. 2 is a diagrammatic illustration of the software architecture component in which the present invention functions. A first or client tier 40 of software services are resident on a customer work station and provides customer access to the enterprise system, having one or more downloadable application objects directed to front end business logic, one or more backplane service objects for managing sessions, one or more presentation services objects for the presentation of customer options and customer requested data in a browser recognizable format and a customer supplied browser for presentation of customer options and data to the customer and for internet communications over the public Internet. Additionally applications are directed to front end services such as the presentation of data in the form of tables and charts, and data processing functions such as sorting and summarizing in a manner such that multiple programs are combined in a unified application suite. A second or middle tier 42, is provided having secure web servers and back end services to provide applications that establish user sessions, govern user authentication and their entitlements, and communicate with adaptor programs to simplify the interchange of data across the network.

A third or back end tier 45 having applications directed to legacy back end services including database storage and retrieval systems and one or more database servers for accessing system resources from one or more legacy hosts.

Generally, as explained in commonly owned, co-pending U.S. patent application Ser. No. 09/159,515, now U.S. Pat. No. 6,115,040, entitled GRAPHICAL USER INTERFACE FOR WEB ENABLED APPLICATIONS, the disclosure of which is incorporated herein by reference thereto, the customer workstation includes client software capable of providing a platform-independent, browser-based, consistent user interface implementing objects programmed to provide a reusable and common GUI abstraction and problem-domain abstractions. More specifically, the client-tier software is created and distributed as a set of Java classes including the applet classes to provide an industrial strength, object-oriented environment over the Internet. Application-specific classes are designed to support the functionality and server interfaces for each application with the functionality delivered through the system being of two-types: 1) cross-product, for example, inbox and reporting functions, and 2) product specific, for example, toll free network management or Call Manager functions. The system is capable of delivering to customers the functionality appropriate to their product mix.

Figure 3:
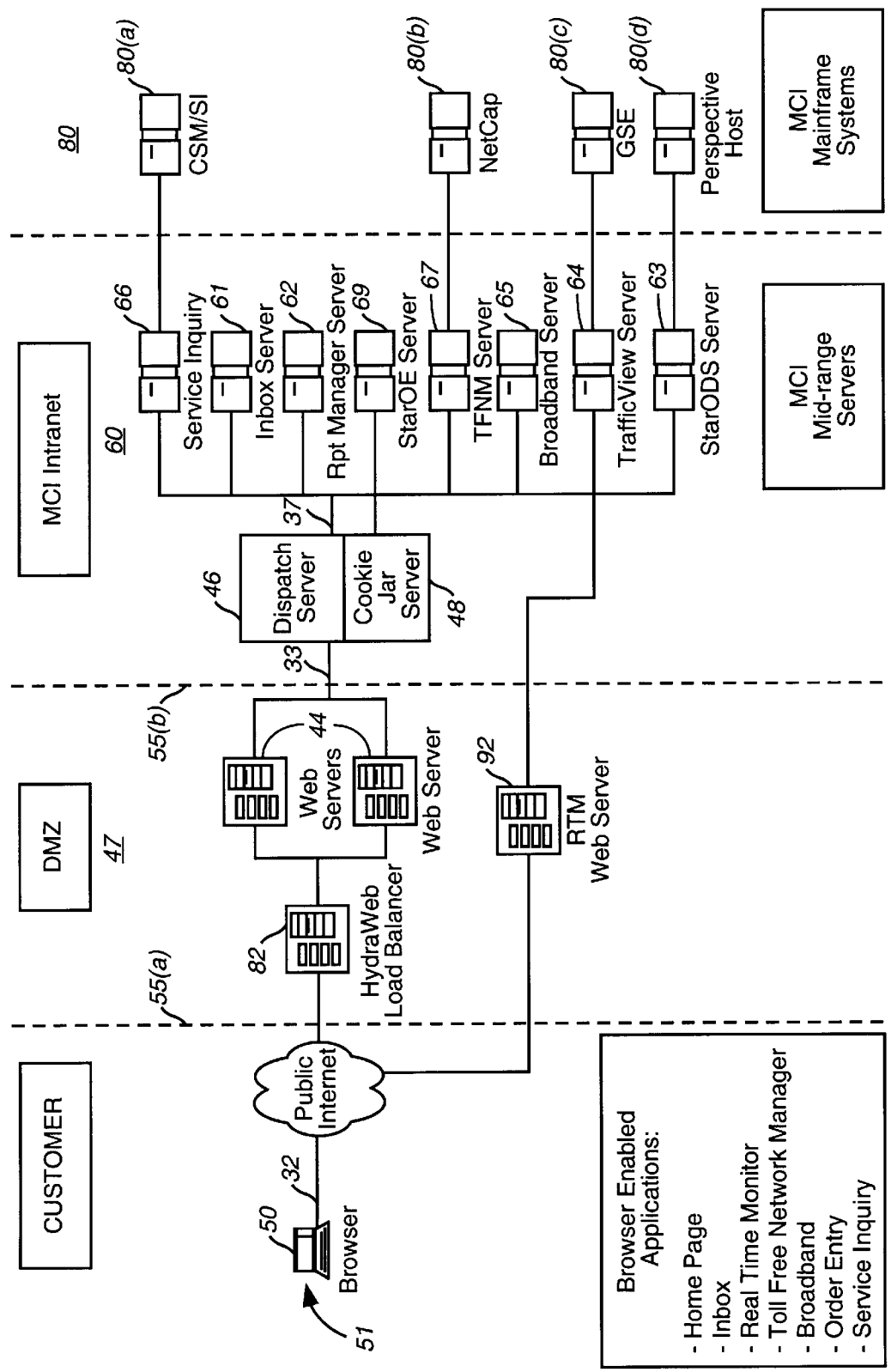
FIG. 3 is a diagrammatic overview of the software architecture of the networkMCI Interact system.

FIG. 3 is a diagrammatic overview of the software architecture of the networkMCI Interact system including: the Customer Browser (a.k.a. the Client) 50; the Demilitarized Zone (DMZ) 47 comprising a Web Servers cluster 44; the MCI Intranet Dispatcher Server 46; and the MCI Intranet Application servers 60, and the data warehouses, legacy systems, etc. 80.

A customer workstation 51 employs a Web Browser 50 implementing client applications responsible for presentation and front-end services. Its functions include providing a user interface to various MCI services and supporting communications with MCI's Intranet web server cluster 44. As illustrated in FIG. 3, and more specifically described in the above-mentioned, co-pending U.S. patent application Ser. No. 09/159,515, now U.S. Pat. No. 6,115,040, entitled GRAPHICAL USER INTERFACE FOR WEB ENABLED APPLICATIONS, the client tier software is responsible for presentation services to the customer and generally includes a web browser 50 and additional object-oriented programs residing in the client workstation platform 51. The client software is generally organized into a component architecture with each component generally comprising a specific application, providing an area of functionality. The applications generally are integrated using a "backplane" services layer 52 which provides a set of services to the application objects which provide the front end business logic and manages their launch. The networkMCI Interact common set of objects provide a set of services to each of the applications such as: 1) session management; 2) application launch; 3) inter-application communications; 4) window navigation among applications; 5) log management; and 6) version management.

The primary common object services include: graphical user interface (GUI); communications; printing; user identity, authentication, and entitlements; data import and export; logging and statistics; error handling; and messaging services.

Figure 4:
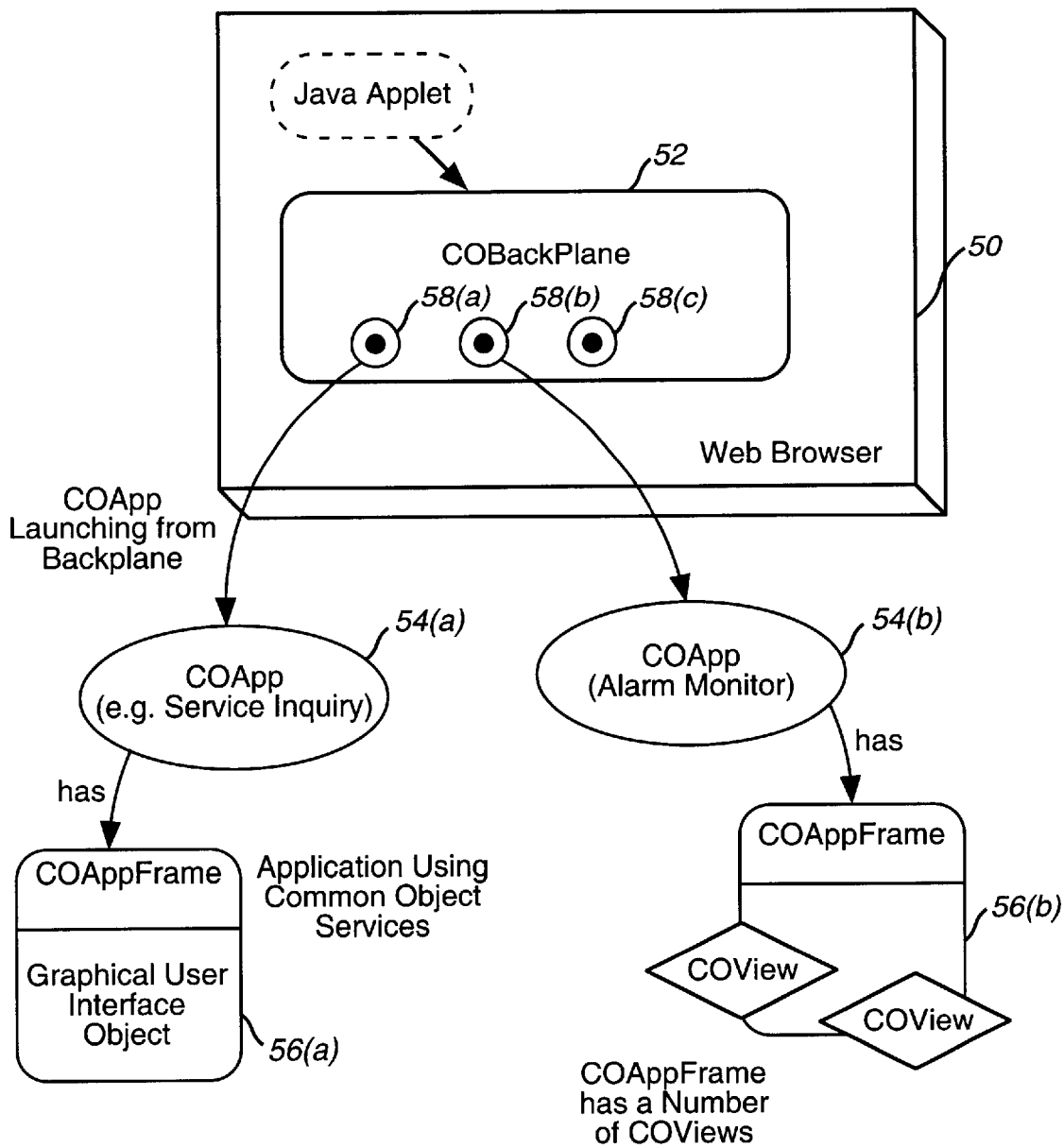
FIG. 4 is an illustrative example of a backplane architecture schematic.

FIG. 4 is a diagrammatic example of a backplane architecture scheme illustrating the relationship among the common objects. In this example, the backplane services layer 52 is programmed as a Java applet which can be loaded and launched by the web browser 50. With reference to FIG. 4, a typical user session starts with a web browser 50 creating a backplane 52, after a successful logon. The backplane 52, inter alia, presents a user with an interface for networkMCI Interact application management. A typical user display provided by the backplane 52 may show a number of applications the user is entitled to run, each application represented by buttons depicted in FIG. 4 as buttons 58a,b,c selectable by the user. As illustrated in FIG. 4, upon selection of an application, the backplane 52 launches that specific application, for example, Service Inquiry 54a or Alarm Monitor 54b, by creating the application object. In processing its functions, each application in turn, may utilize common object services provided by the backplane 52. FIG. 4 shows graphical user interface objects 56a,b created and used by a respective application 54a,b for its own presentation purposes.

Figure 5:
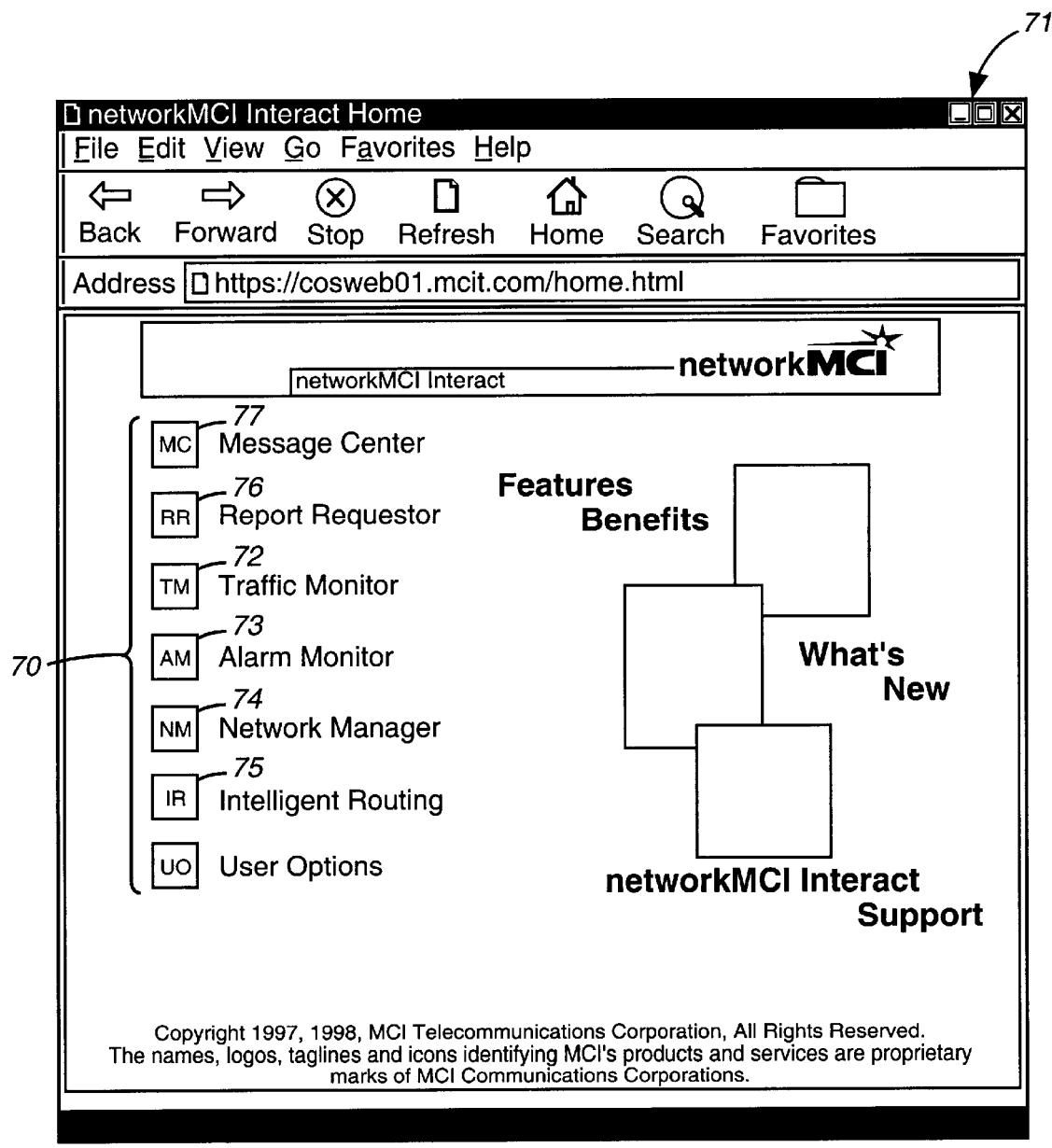
FIG. 5 illustrates an example client GUI presented to the client/customer as a browser web page.

FIG. 5 illustrates an example client GUI presented to the client/customer as a browser web page 71 providing, for example, a suite 70 of network management reporting applications including: MCI Traffic Monitor 72; an alarm monitor 73; a Network Manager 74 and Intelligent Routing 75. Access to network functionality is also provided through Report Requester 76, which provides a variety of detailed reports for the client/customer and a Message Center 77 for providing enhancements and functionality to traditional e-mail communications.

As shown in FIGS. 3 and 4, the browser resident GUI of the present invention implements a single object, COBack-Plane which keeps track of all the client applications, and which has capabilities to start, stop, and provide references to any one of the client applications.

The backplane 52 and the client applications use a browser 50 such as the Microsoft Explorer versions 4.0.1 or higher for an access and distribution mechanism. Although the backplane is initiated with a browser 14, the client applications are generally isolated from the browser in that they typically present their user interfaces in a separate frame, rather than sitting inside a Web page.

The backplane architecture is implemented with several primary classes. These classes include COBackPlane, COApp, COAppImpl, COParm. and COAppFrame classes. COBackPlane 52 is an application backplane which launches the applications 54a, 54b, typically implemented as COApp. COBackPlane 52 is generally implemented as a Java applet and is launched by the Web browser 50. This backplane applet is responsible for launching and closing the COApps.

When the backplane is implemented as an applet, it overrides standard Applet methods init( ), start( ), stop( ) and run( ). In the init( ) method, the backplane applet obtains a COUser user context object. The COUser object holds information such as user profile, applications and their entitlements. The user's configuration and application entitlements provided in the COUser context are used to construct the application toolbar and Inbox applications. When an application toolbar icon is clicked, a particular COApp is launched by launchApp( ) method. The launched application then may use the backplane for inter-application communications, including retrieving Inbox data.

The CoBackPlane 52 includes methods for providing a reference to a particular COApp, for interoperation. For example, the COBackPlane class provides a getApp( ) method which returns references to application objects by name. Once retrieved in this manner, the application object's public interface may be used directly.

The use of a set of common objects for implementing the various functions provided by the system of the present invention, and particularly the use of browser based objects to launch applications and pass data therebetween is more fully described in the above-referenced, copending application GRAPHICAL USER INTERFACE FOR WEB ENABLED APPLICATIONS.

As shown in FIG. 3, the aforesaid objects will communicate the data by establishing a secure TCP messaging session with one of the DMZ networkMCI Interact Web servers 44 via an Internet secure communications path 32 established, preferably, with a secure sockets SSL version of HTTPS. The DMZ networkMCI Interact Web servers 44 function to decrypt the client message, preferably via the SSL implementation, and unwrap the session key and verify the users session. After establishing that the request has come from a valid user and mapping the request to its associated session, the DMZ Web servers 44 will re-encrypt the request using symmetric encryption and forward it over a second socket connection 33 to the dispatch server 46 inside the enterprise Intranet.

As described in greater detail in commonly owned, co-pending U.S. patent application Ser. No. 09/159,514, now allowed, entitled SECURE CUSTOMER INTERFACE FOR WEB-BASED DATA MANAGEMENT, the contents and disclosure of which is incorporated by reference as if fully set forth herein, a networkMCI Interact session is designated by a logon, successful authentication, followed by use of server resources, and logoff. However, the worldwide web communications protocol uses HTTP, a stateless protocol, each HTTP request and reply is a separate TCP/IP connection, completely independent of all previous or future connections between the same server and client. The nMCI Interact system is implemented with a secure version of HTTP such as S-HTTP or HTTPS, and preferably utilizes the SSL implementation of HTTPS. The preferred embodiment uses SSL which provides a cipher spec message which provides server authentication during a session. The preferred embodiment further associates a given HTTPS request with a logical session which is initiated and tracked by a "cookie jar server" 48 to generate a "cookie" which is a unique server-generated key that is sent to the client along with each reply to a HTTPS request. The client holds the cookie and returns it to the server as part of each subsequent HTTPS request. As desired, either the Web servers 44, the cookie jar server 48 or the Dispatch Server 46, may maintain the "cookie jar" to map these keys to the associated session. A separate cookie jar server 48, as illustrated in FIG. 3 has been found desirable to minimize the load on the dispatch server 46. This form of session management also functions as an authentication of each HTTPS request, adding an additional level of security to the overall process.

As illustrated in FIG. 3, after one of the DMZ Web servers 44 decrypts and verifies the user session, it forwards the message through a firewall 55b over a TCP/IP connection 33 to the dispatch server 46 on a new TCP socket while the original socket 32 from the browser is blocking, waiting for a response. The dispatch server 46 will unwrap an outer protocol layer of the message from the DMZ services cluster 44, and will reencrypt the message with symmetric encryption and forward the message to an appropriate application proxy via a third TCP/IP socket 37. While waiting for the proxy response, all three of the sockets 32, 33, 37 will be blocking on a receive. Specifically, once the message is decrypted, the wrappers are examined to reveal the user and the target middle-tier (Intranet application) service for the request. A first-level validation is performed, making sure that the user is entitled to communicate with the desired service. The user's entitlements in this regard are fetched by the dispatch server 46 from StarOE server 69 at logon time and cached.

If the requestor is authorized to communicate with the target service, the message is forwarded to the desired service's proxy. Each application proxy is an application specific daemon which resides on a specific Intranet server, shown in FIG. 3 as a suite of mid-range servers 60. Each Intranet application server of suite 60 is generally responsible for providing a specific back-end service requested by the client, and, is additionally capable of requesting services from other Intranet application servers by communicating to the specific proxy associated with that other application server. Thus, an application server not only can offer its browser a client to server interface through the proxy, but also may offer all its services from its proxy to other application servers. In effect, the application servers requesting service are acting as clients to the application servers providing the service. Such mechanism increases the security of the overall system as well as reducing the number of interfaces.

The network architecture of FIG. 3 may also include a variety of application specific proxies having associated Intranet application servers including: a StarOE proxy for the StarOE application server 69 for handling authentication order entry/billing; an Inbox proxy for the Inbox application server 61, which functions as a container for completed reports, call detail data and marketing news messages, a Report Manager Proxy capable of communicating with a system-specific Report Manager server 62 for generating, managing and scheduling the transmission of customized reports including, for example: call usage analysis information provided from the StarODS server 63; network traffic analysis/monitor information provided from the Traffic view server 64; virtual data network alarms and performance reports provided by Broadband server 65; trouble tickets for switching, transmission and traffic faults provided by Service Inquiry server 66; and toll free routing information provided by Toll Free Network Manager server 67.

As partially shown in FIG. 3, it is understood that each Intranet server of suite 60 communicates with one or several consolidated network databases which include each customer's network management information and data. In the present invention the Services Inquiry server 36 includes communication with MCI's Customer Service Management legacy platform 80(a). Such network management and customer network data is additionally accessible by authorized MCI management personnel. As shown in FIG. 3, other legacy platforms 80(b), 80(c) and 80(d) may also communicate individually with the Intranet servers for servicing specific transactions initiated at the client browser. The illustrated legacy platforms 80(a)–(d) are illustrative only and it is understood other legacy platforms may be interpreted into the network architecture illustrated in FIG. 3 through an intermediate midrange server 60.

Each of the individual proxies may be maintained on the dispatch server 46, the related application server, or a separate proxy server situated between the dispatch server 46 and the midrange server 30. The relevant proxy waits for requests from an application client running on the customer's workstation 50 and then services the request, either by handling them internally or forwarding them to its associated Intranet application server 60. The proxies additionally receive appropriate responses back from an Intranet application server 60. Any data returned from the Intranet application server 60 is translated back to client format, and returned over the internet to the client workstation 50 via the Dispatch Server 46 and at one of the web servers in the DMZ Services cluster 44 and a secure sockets connection. When the resultant response header and trailing application specific data are sent back to the client browser from the proxy, the messages will cascade all the way back to the browser 14 in real time, limited only by the transmission latency speed of the network.

The networkMCI Interact middle tier software includes a communications component offering three (3) types of data transport mechanisms: 1) Synchronous; 2) Asynchronous; and 3) Bulk transfer. Synchronous transaction is used for situations in which data will be returned by the application server 60 quickly. Thus, a single TCP connection will be made and kept open until the full response has been retrieved.

Asynchronous transaction is supported generally for situations in which there may be a long delay in application server 60 response. Specifically, a proxy will accept a request from a customer or client 50 via an SSL connection and then respond to the client 50 with a unique identifier and close the socket connection. The client 50 may then poll repeatedly on a periodic basis until the response is ready. Each poll will occur on a new socket connection to the proxy, and the proxy will either respond with the resultant data or, respond that the request is still in progress. This will reduce the number of resource consuming TCP connections open at any time and permit a user to close their browser or disconnect a modem and return later to check for results.

Bulk transfer is generally intended for large data transfers and are unlimited in size. Bulk transfer permits cancellation during a transfer and allows the programmer to code resumption of a transfer at a later point in time.

Figure 6:
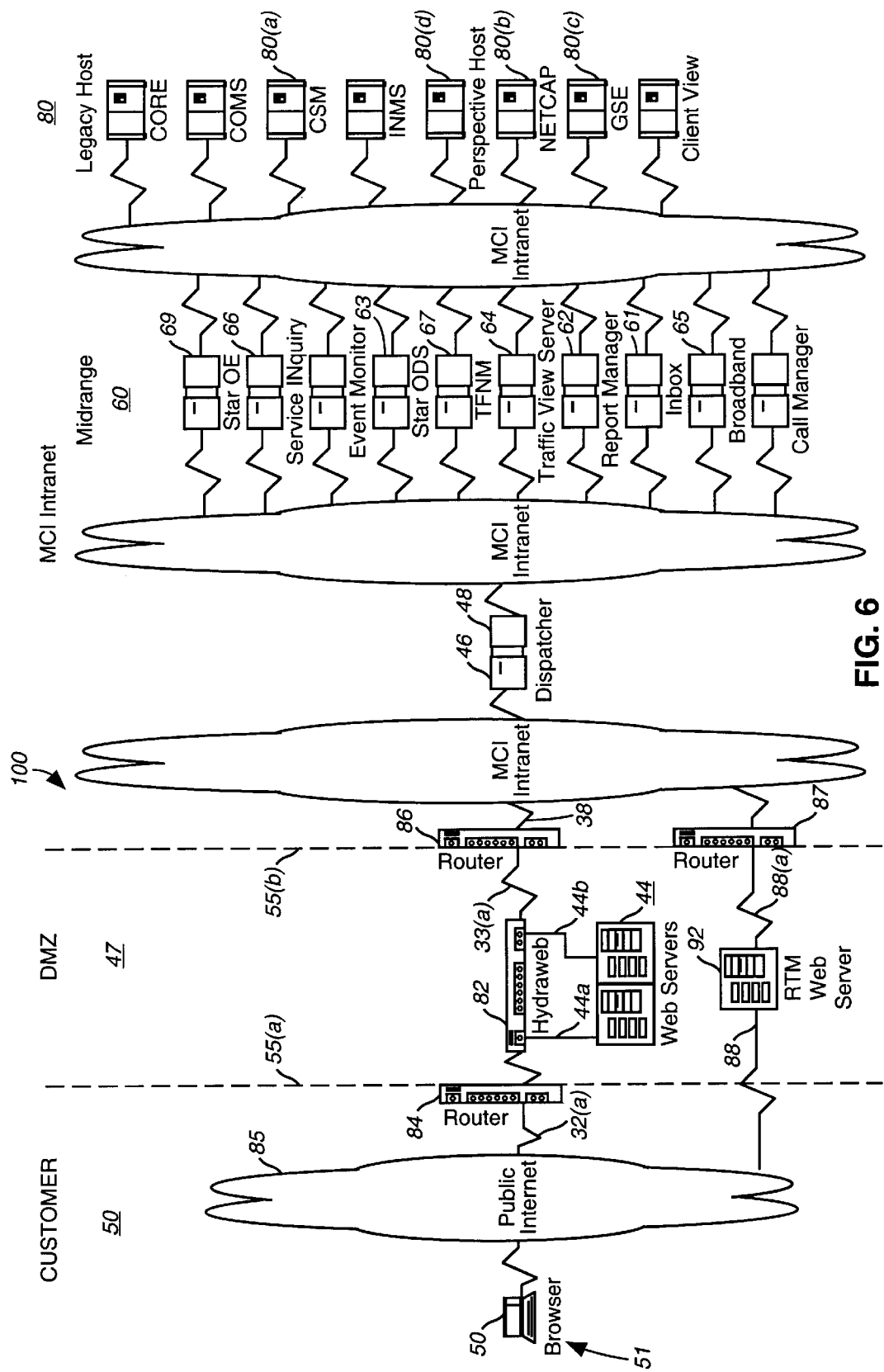
FIG. 6 is a diagram depicting the physical networkMCI Interact system architecture.

FIG. 6 is a diagram depicting the physical networkMCI Interact system architecture 100. As shown in FIG. 6, the system is divided into three major architectural divisions including: 1) the customer workstation 50 which include those mechanisms enabling customer connection to the Secure web servers 44; 2) a secure network area 47, known as the DeMilitarized Zone "DMZ" set aside on MCI premises double firewalled between the both the public Internet 85 and the MCI Intranet to prevent potentially hostile customer attacks; and, 3) the MCI Intranet Midrange Servers 60 and Legacy Mainframe Systems 80 which comprise the back end business logic applications.

As illustrated in FIG. 6, the present invention includes a double or complex firewall system that creates a "demilitarized zone" (DMZ) between two firewalls 55a, 55b. In the preferred embodiment, one of the firewalls 55b includes port specific filtering routers, which may only connect with a designated port address. For example, router 84 (firewall 55(a)) may connect only to the addresses set for the HydraWeb® (or web servers 44) within the DMZ, and router 86 (firewall 55(b)) may only connect to the port addresses set for the dispatch server 46 within the network. In addition, the dispatch server 46 connects with an authentication server, and through a proxy firewall to the application servers. This ensures that even if a remote user ID and password are hijacked, the only access granted is to one of the web servers 44 or to intermediate data and privileges authorized for that user. Further, the hijacker may not directly connect to any enterprise server in the enterprise intranet beyond the DMZ, thus ensuring internal company system security and integrity. Even with a stolen password, the hijacker may not connect to other ports, root directories or application servers within the enterprise system, and the only servers that may be sabotaged or controlled by a hacker are the web servers 44.

The DMZ 47 acts as a double firewall for the enterprise intranet because of the double layer of port specific filtering rules. Further, the web servers 44 located in the DMZ never store or compute actual customer sensitive data. The web servers only transmit the data in a form suitable for display by the customer's web browser. Since the DMZ web servers do not store customer data, there is a much smaller chance of any customer information being jeopardized in case of a security breach. In the preferred embodiment, firewalls or routers 84, 86 are a combination of circuit gateways and filtering gateways or routers using packet filtering rules to grant or deny access from a source address to a destination address. All connections from the internal application servers are proxied and filtered through the dispatcher before reaching the web servers 44. Thus it appears to any remote site, that the connection is really with the DMZ site, and identity of the internal server is doubly obscured. This also prevents and direct connection between any external and any internal network or intranet computer.

The filtering firewalls 55(a), (b) may also pass or block specific types of Internet protocols. For example, FTP can be enabled only for connections to the In-Box server 61, and denied for all other destinations. SMTP can also be enabled to the In-Box server, but Telnet denied. The In-box server 61 is a store and forward server for client designated reports, but even in this server, the data and meta-data are separated to further secure the data, as will be described.

As previously described, the customer access mechanism is a client workstation 51 employing a Web browser 50 for providing the access to the networkMCI Interact system via the public Internet 85. When a subscriber connects to the networkMCI Interact Web site by entering the appropriate URL, a secure TCP/IP communications link 32a is established to one of several Web servers 44 located inside a first firewall 55a in the DMZ 47. Preferably at least two web servers are provided for redundancy and failover capability. In the preferred embodiment of the invention, the system employs SSL encryption so that communications in both directions between the subscriber and the networkMCI Interact system are secure.

In the preferred embodiment, all DMZ Secure Web servers 44 are preferably DEC 4100 systems having Unix or NT-based operating systems for running services such as HTTPS, FTP, and Telnet over TCP/IP. The web servers may be interconnected by a fast Ethernet LAN running at 100 Mbit/sec or greater, preferably with the deployment of switches within the Ethernet LANs for improved bandwidth utilization. One such switching unit included as part of the network architecture is a HydraWEB® unit 82, manufactured by HydraWEB Technologies, Inc., which provides the DMZ with a virtual IP address so that subscriber HTTPS requests received over the Internet will always be received. The Hydraweb® unit 82 implements a load balancing algorithm enabling intelligent packet routing and providing optimal reliability and performance by guaranteeing accessibility to the "most available" server. It particularly monitors all aspects of web server health from CPU usage, to memory utilization, to available swap space so that Internet/Intranet networks can increase their hit rate and reduce Web server management costs. In this manner, resource utilization is maximized and bandwidth (throughput) is improved. It should be understood that a redundant Hydraweb® unit may be implemented in a Hot/Standby configuration with heartbeat messaging between the two units (not shown). Moreover, the networkMCI Interact system architecture affords web server scaling, both in vertical and horizontal directions. Additionally, the architecture is such that new secure web servers 44 may be easily added as customer requirements and usage increases.

As shown in FIG. 6, the most available Web server 44 receives subscriber HTTPS requests, for example, from the HydraWEB® 82 over a connection 44b and generates the appropriate encrypted messages for routing the request to the appropriate MCI Intranet midrange web server over connection 44a, router 86 and connection 44b. Via the Hydraweb® unit 82, a TCP/IP connection 38 links the Secure Web server 44 with the MCI Intranet Dispatcher server 46.

Further as shown in the DMZ 47 is a second RTM server 92 having its own connection to the public Internet via a TCP/IP connection 88. As described in co-pending U.S. patent application Ser. No. 09/159,516, entitled INTEGRATED PROXY INTERFACE FOR WEB BASED TELECOMMUNICATIONS MANAGEMENT TOOLS, this RTM server provides real-time session management for subscribers of the networkMCI Interact Real Time Monitoring system. An additional TCP/IP connection 88a links the RTM Web server 92 with the MCI Intranet Dispatcher server 46. As further shown in FIG. 6, a third router 87 is provided for routing encrypted subscriber messages from the RTM Web server 92 to the Dispatcher server 46 inside the second firewall. Although not shown, each of the routers 86, 87 may additionally route signals through a series of other routers before eventually being routed to the nMCI Interact Dispatcher server 46. In operation, each of the Secure servers 44 function to decrypt the client message, preferably via the SSL implementation, and unwrap the session key and verify the users session from the COUser object authenticated at Logon.

After establishing that the request has come from a valid user and mapping the request to its associated session, the Secure Web servers 44 will re-encrypt the request using symmetric RSA encryption and forward it over a second socket connection 38 to the dispatch server 46 inside the enterprise Intranet.

As described herein, and in greater detail in co-pending U.S. patent application Ser. No. 09/159,695, the data architecture component of networkMCI Interact reporting system is focused on the presentation of real time (un-priced) call detail data, such as provided by MCI s TrafficView Server 64, and priced call detail data and reports, such as provided by MCI s StarODS Server 63 in a variety of user selected formats.

All reporting is provided through a Report Requestor GUI application interface which support spreadsheet, a variety of graph and chart types, or both simultaneously. For example, the spreadsheet presentation allows for sorting by any arbitrary set of columns. The report viewer may also be launched from the inbox when a report is selected.

A common database may be maintained to hold the common configuration data which can be used by the GUI applications and by the mid-range servers. Such common data will include but not be limited to: customer security profiles, billing hierarchies for each customer, general reference data (states, NPA's, Country codes), and customer specific pick lists: e.g., ANI's, calling cards, etc. An MCI Internet StarOE server will manage the data base for the common configuration of data.

Report management related data is also generated which includes 1) report profiles defining the types of reports that are available, fields for the reports, default sort options and customizations allowed; and 2) report requests defining customer specific report requests including report type, report name, scheduling criteria, and subtotal fields. This type of data will be resident in an Inbox server database and managed by the Inbox server.

The Infrastructure component of the nMCI Reporting system includes means for providing secure communications regardless of the data content being communicated. As described in detail in above-referenced, co-pending U.S. patent application Ser. No. 09/159,514, now allowed, the nMCI Interact system security infrastructure includes: 1) authentication, including the use of passwords and digital certificates; 2) public key encryption, such as employed by a secure sockets layer (SSL) encryption protocol; 3) firewalls, such as described above with reference to the network architecture component; and 4) non-repudiation techniques to guarantee that a message originating from a source is the actual identified sender. One technique employed to combat repudiation includes use of an audit trail with electronically signed one-way message digests included with each transaction.

Another component of the nMCI Interact infrastructure includes order entry, which is supported by the Order Entry ("StarOE") server. The general categories of features to be ordered include: 1) Priced Reporting; 2) Real-time reporting; 3) Priced Call Detail; 4) Real Time Call Detail; 5) Broadband SNMP Alarming; 6) Broadband Reports; 7) Inbound RTM; 8) Outbound RTM; 9) Toll Free Network Manager; and 10) Call Manager. The order entry functionality is extended to additionally support 11) Event Monitor; 12) Service Inquiry; 13) Outbound Network Manager; 14) Portfolio; and, 15) Client View.

The Self-monitoring infrastructure component for nMCI Interact is the employment of mid-range servers that support SNMP alerts at the hardware level. In addition, all software processes generate alerts based on process health, connectivity, and availability of resources (e.g., disk usage, CPU utilization, database availability).

The Metrics infrastructure component for nMCI Interact is the employment of means to monitor throughput and volumes at the Web servers, dispatcher server, application proxies and mid-range servers. Metrics monitoring helps in the determination of hardware and network growth.

To provide the areas of functionality described above, the client tier 50 is organized into a component architecture, with each component providing one of the areas of functionality. As explained in further detail in co-pending U.S. patent application Ser. No. 09/159,515, now issued as U.S. Pat. No. 6,115,040, the client-tier software is organized into a "component" architecture supporting such applications as inbox fetch and inbox management, report viewer and report requestor, TFNM, Event Monitor, Broadband, Real-Time Monitor, and system administration applications. Further functionality integrated into the software architecture includes applications such as Outbound Network Manager, Call Manager, Service Inquiry and Client View.

Figure 7:
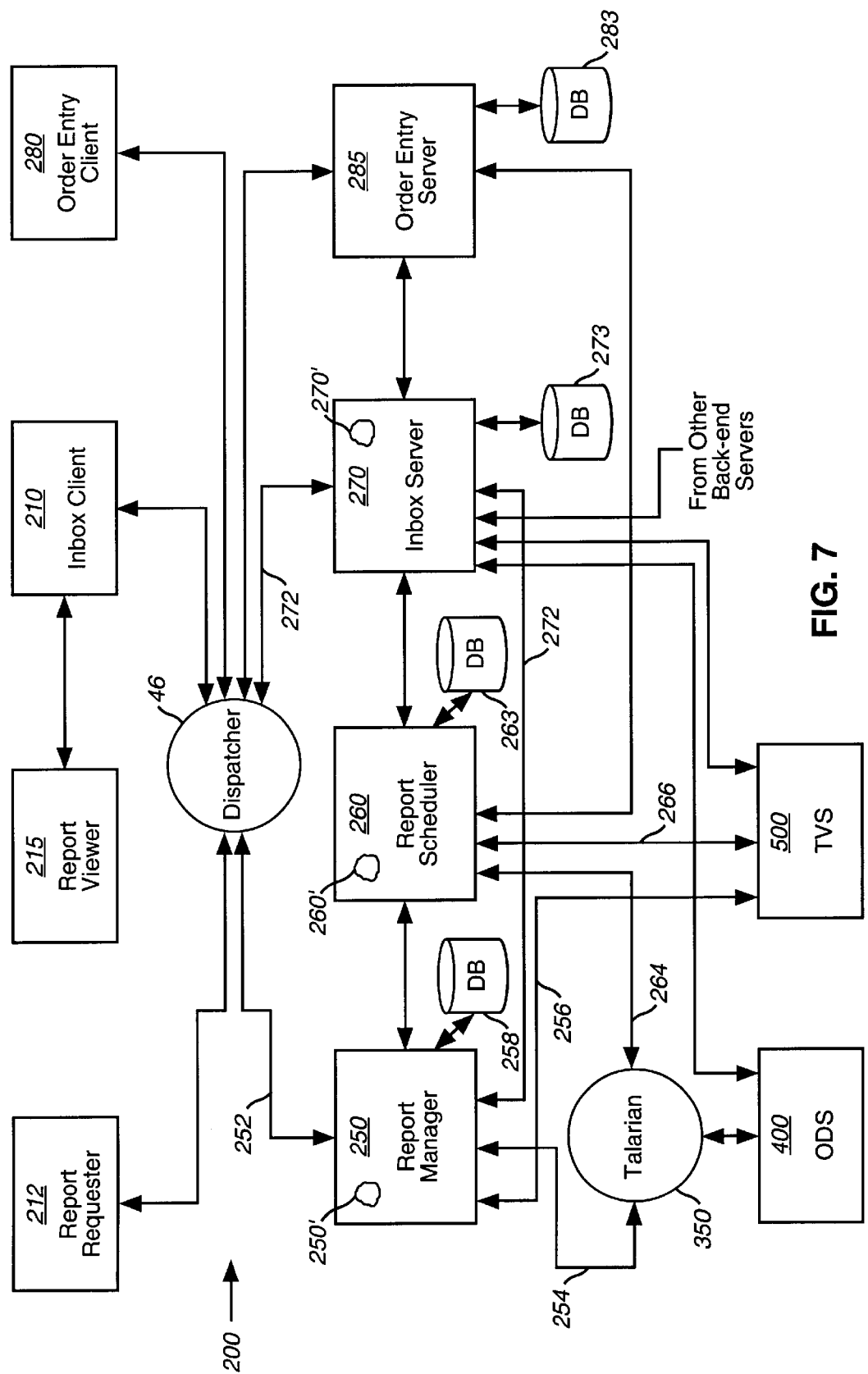
FIG. 7 is a block diagram depicting the physical architecture of the StarWRS component of networkMCI Interact Reporting system.

The present invention focuses on the client and middle-tier service and application proxy components that enable customers to request, specify, customize, schedule and receive their telecommunications network call detail data and account information in the form of reports that are generated by the various back-end application servers. Referred to herein as "StarWRS", this WWW/Internet Reporting System 200, as shown in FIG. 7, comprises the following components and messaging interfaces:

1) those components associated with the Client GUI front end including a report requester client application 212, a report viewer client application 215 and, an Inbox client application 210 which implement the logical processes associated with a "Java Client", i.e., employs Java applets launched from the backplane (FIG. 3) that enable the display and creation of reports and graphs based on the fields of the displayed reports, and, allows selection of different reporting criteria and options for a given report; and, 2) those middle-tier server components enabling the above-mentioned reporting functionality including: a Report Manager server 250, a Report scheduler server 260, and an Inbox Server 270. Also shown in FIG. 7 are the system Order Entry client application 280 and a corresponding Order Entry Server 285 supporting the StarWRS reporting functionality as will be described.

Each of these components will now be described with greater particularity hereinbelow.

The Report Manager ("RM") server 250 is an application responsible for the synchronization of report inventory with the back-end "Fulfilling" servers 300; retrieval of entitlements, i.e., a user's security profiles, and report pick list information, i.e., data for user report customization options, from the system Order Entry server 280; the transmission of report responses or messages to the Dispatcher server 26 (FIG. 7); the maintenance of the reporting databases; and, the management of metadata used for displaying reports. In the preferred embodiment, the RM server 250 employs a Unix daemon that passively listens for connect requests from the GUI client applications and other back-end servers and deploys the TCP/IP protocol to receive and route requests and their responses. Particularly, Unix stream sockets using the TCP/IP protocol suite are deployed to listen for client connections on a well-known port number on the designated host machine. Client processes, e.g., report requestor 212, wishing to submit requests connect to RM 250 via the dispatcher 26 by providing the port number and host name associated with RM 250. Request messages received by the RM server are translated into a "metadata" format and are validated by a parser object built into a report manager proxy 250' that services requests that arrive from the GUI front-end. If the errors are found in the metadata input, the RM 250 returns an error message to the requesting client. If the metadata passes the validation tests, the request type will be determined and data will be retrieved in accordance with the metadata request after which a response will be sent back to the requesting client.

As shown in FIG. 7, interface sockets 252 are shown connecting the Dispatcher server 46 and the RM server 250 and, other socket connections 254, 256 provide the interface between the RM 250 and respective middle tier systems 400 and 500. For instance, fulfilling system 400 receives requests for a customer's priced billing data through a publish-and-subscribe Talarian smart socket messaging interface 350 providing guaranteed message delivery of messages from the Report Manager. It should be understood that the RM 250 server can manage reporting data for customer presentation from other middle-tier and back-end legacy systems including, e.g., TrafficView, Broadband, Service Inquiry, etc. in order to present to a customer these types of network management data.

The report manager server additionally utilizes a database 258, such as provided by Informix, to provide accounting of metadata and user report inventory. Preferably, an SQL interface is utilized to access stored procedures used in processing requests and tracking customer reports. A variety of C++ tools and other tools such as Rogue Wave's tools.h++ are additionally implemented to perform metadata message parsing validation and translation functions.

The Report Manager server 250 additionally includes the scheduling information, however, a report scheduler server component passes report requests to the back-end fulfilling systems 400, 500 at the scheduled times.

The Report Scheduler ("RS") server component 260 is a perpetually running Unix daemon that deploys the TCP/IP protocol to send requests to the back-end fulfilling servers 400, 500, and receive their responses. More particularly, the RS server 260 is a Unix server program designed to handle and process report requests to the fulfilling servers by deploying Unix stream sockets using the TCP/IP protocol suite, and sending the report request to client connections on a well-known port number on the designated host machine. As shown in FIG. 7, interface socket connections 264, 266 are shown interfacing with respective back end servers 400 and 500. In the case of priced billing data from a StarODS fulfilling server 400, report requests are published by the RS server 260 to a pre-defined subject on the Talarian Server. When handling other incoming messages published by back end servers using Talarian SmartSockets 4.0, another daemon process is provided that uses Talarian C++ objects to connect their message queue and extract all messages for a given subject for storage in a database table included in database 263. Each message includes the track number of the report that was requested from the fulfilling server.

From the report scheduler interface, the user may specify the type of reporting, including an indication of the scheduling for the report, e.g., hourly, daily, weekly or monthly. For priced data the user has the option of daily, weekly, or monthly. For real-time, or unpriced data, the user has the option of hourly, daily, weekly or monthly. The report scheduler interface additionally enables a user to specify a page or E-mail account so that a respective page or e-mail message may be sent to indicate when a requested report is in the Inbox server 270.

As shown in FIG. 7, the report scheduler server 260 interfaces directly with the Report Manager server 250 to coordinate report request processing. The respective report management and scheduling functions could be performed in a single server. An overview of the report request/scheduling process implemented by StarWRS Report Manager and Report Requestor tools may be found in commonly owned, co-pending U.S. patent application Ser. No. 09/159, 409, entitled INTEGRATED PROXY INTERFACE FOR WEB BASED REPORT REQUESTOR TOOL SET, the contents and disclosure of which is incorporated by reference as if fully set forth herein.

The Inbox Server component 270 serves as the repository where the completed user report data is stored, maintained, and eventually deleted and is the source of data that is uploaded to the client user via the dispatcher over a secure socket connection 272. It is also a Unix program that is designed to handle and process user requests submitted in metadata format using an Informix database. Once report results are received from the StarODS 400 and TVS 500 and any other middle tier or fulfilling servers, the Inbox server 270 requests the metadata from the Report Manager server 250 as indicated by the socket connection 272 in FIG. 7. The metadata is stored in the Inbox server database 273 along with the report results. Thus, if the metadata is required to be changed, it will not interfere with the information needed to display the reports contained in the Inbox. Additionally, as shown in FIG. 7, the Inbox server interfaces with the report scheduler to coordinate execution and presentation of reports.

The StarOE server 280 is the repository of user pick lists and user reporting entitlements as shown in database 283. Particularly, it is shown interfacing with the Inbox server 270 and report scheduler servers 260. The Report Manager does not interface with or include metadata for StarOE. It will, however, include information in the report metadata that will tell the Report Requestor it needs to get information (i.e., Pick Lists) from StarOE server 285. Particularly, as shown in Appendix A, the StarOE server supports pick lists for the selection of priced data based on the following list: Date, Time (e.g., provided in GMT offset), ID Accounting Code (IDACC)/Supp code, Access Type, Corp ID, Service Location w/Service Location Names, Bill Payer w/Bill Payer Names, 8XX Number, City, State/Province, Numbering Plan Area (NPA), NXX (Exchange code where N=2–9 and X=0–9), and Country Code.

A common database is maintained to hold the common configuration data which can be used by the GUI applications and by the mid-range servers. Such common data will include but not be limited to: customer security profiles, billing hierarchies for each customer, general reference data (states, NPAs, Country codes), and customer specific pick lists: e.g., ANIs, calling cards, etc.

With regard to the front-end client GUI components, the above-mentioned Inbox client application 210 functions as an interface between the client software and the Inbox server 270 for presenting to the customer the various type of reports and messages received at the Inbox including all completed reports, call detail, alarms, and news. Preferably, the messages for the user in the inbox is sorted by type (e.g., report, call detail, alarms) and then by report type, report name, date, and time. A more detailed description of the StarWRS Inbox Server component may be found in commonly-owned, co-pending U.S. patent application Ser. No. 09/159, 512, entitled MULTI-THREADED WEB BASED USER IN-BOX FOR REPORT MANAGEMENT, the contents and disclosure of which is incorporated by reference as if fully set forth herein.

Particularly, the Inbox client application uses the services of the backplane (FIG. 3) to launch other applications as needed to process report messages. The inbox will also use the services of the data export objects to provide a save/load feature for inbox messages, and, is used to provide a user-interface for software upgrade/download control. Inbox messages are generated by the versioning services of the backplane; actual downloads will be accomplished by a request through the inbox.

In the preferred embodiment, the inbox client receives information on multiple threads to allow a high priority message to get through even if large download is in progress. Typically, the browser is configured to allow more than one network connection simultaneously, i.e., the polling thread on the client uses a separate connection to check for new messages, and start a new thread on a new connection when a new message was detected. In this way, multiple messages may be downloaded simultaneously.

The Report Requester application 212 is a GUI Applet enabling user interaction for managing reports and particularly includes processes supporting: the creation, deletion, and editing of the user's reports; the retrieval and display of selected reports; the display of selected option data; and the determination of entitlements which is the logical process defining what functionality a user can perform on StarWRS. In the preferred embodiment, a Report request may be executed immediately, periodically, or as "one-shots" to be performed at a later time. As described herein, the report scheduler service maintains a list of requested reports for a given user, and forward actual report requests to the appropriate middle-tier servers at the appropriate time. Additional functionality is provided to enable customers to manage there inventory, e.g., reschedule, change, or cancel (delete) report requests.

The Report Viewer application 215 is a GUI Applet enabling a user to analyze and display the data and reports supplied from the StarODS fulfilling system 400. Particularly, the Report Manager 250 includes and provides access to the metadata which is used to tell the Report Requestor what a standard report should look like and the "pick-list" options the user has in order for them to customize the standard report. It is used to tell the Report Viewer client how to display the report, what calculations or translations need to be performed at the time of display, and what further customization options the user has while viewing the report. It additionally includes a common report view by executing a GUI applet that is used for the display and graphing of report data and particularly, is provided with spreadsheet management functionality that defines what operations can be performed on the spreadsheet including the moving of columns, column hiding, column and row single and multiple selection, import and export of spreadsheet data, and printing of spreadsheet, etc. It is also provided with report data management functionality by defining what operations can be performed on the data displayed in a spreadsheet including dynamic operations as sorting of report data, sub-totaling of report data, etc. Furthermore, the report viewer 215 interprets metadata; and, communicates with the Backplane (FIG. 4). The report viewer application 215 additionally accepts messages telling it to display an image or text that may be passed by one of the applications in lieu of report data (e.g., Invoice, Broadband report, etc.)

All reporting is provided through the Report Viewer interface which supports spreadsheet, a variety of graphic and chart types, or both types simultaneously. The spreadsheet presentation allows for sorting by any arbitrary set of columns. The report viewer 215 is launched from the inbox client 210 when a report is selected and may also be launched from the inbox when a report is selected.

By associating each set of report data which is uploaded from the Inbox server 270 with a "metadata" report description object, reports may be presented without a report-specific presentation code. At one level, metadata descriptions function like the catalog in a relational database, describing each row of a result set returned from the middle tier as an ordered collection of columns. Each column has a data type, a name, and a desired display format, etc. Column descriptive information will be stored in an object, and the entire result set will be described by a list of these objects, one for each column, to allow for a standard viewer to present the result set, with labeled columns. Nesting these descriptions within one another allows for breaks and sub-totaling at an arbitrary number of levels. The same metadata descriptions may be used to provide common data export and report printing services. When extended to describe aggregation levels of data within reporting dimensions, it may be used for generic rollup/drilldown spreadsheets with "just-in-time" data access.

The metadata data type may include geographic or telecommunications-specific information, e.g., states or NPAs. The report viewer may detect these data types and provide a geographic view as one of the graph/chart types.

Figure 8:
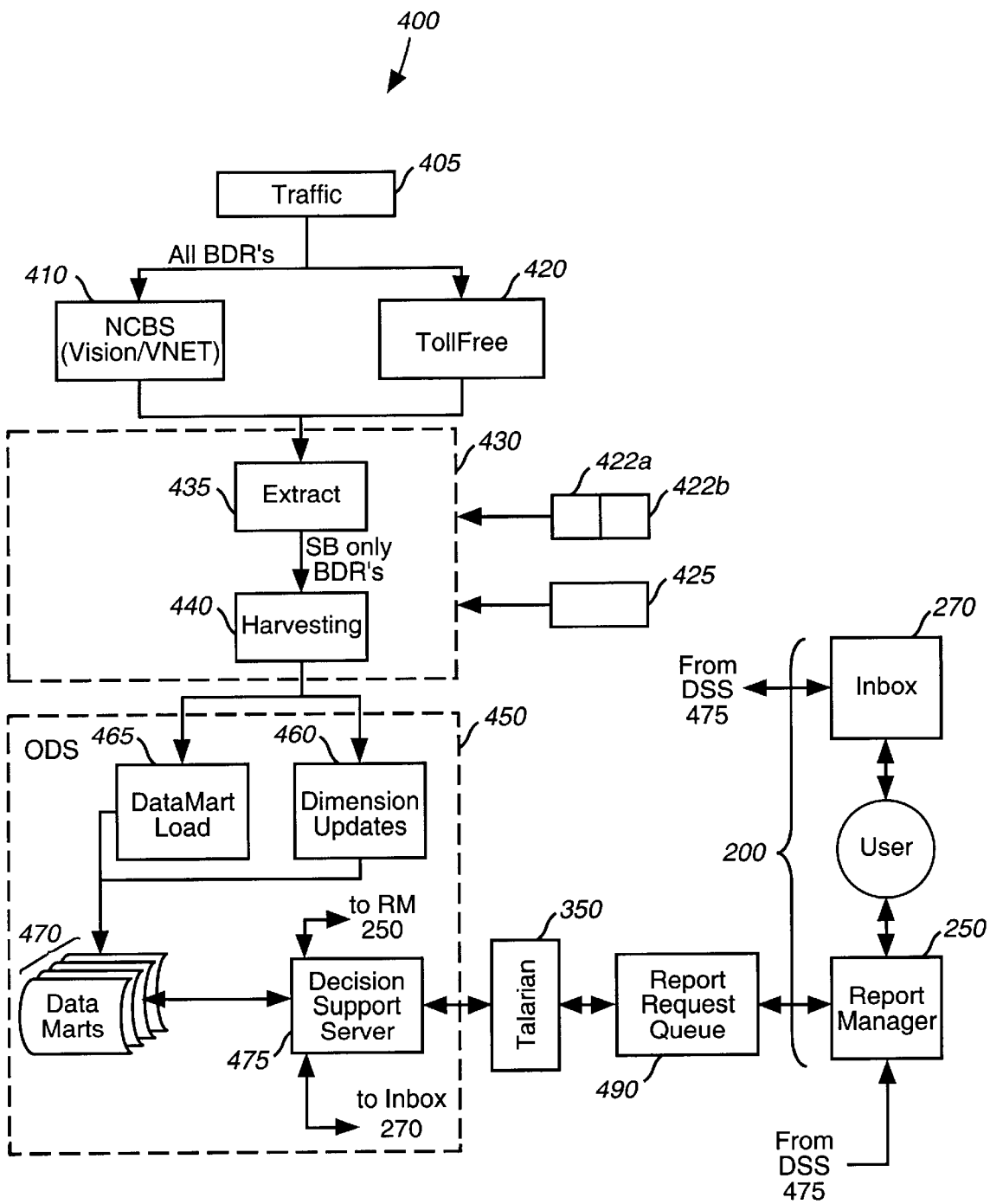
FIG. 8 illustrates the primary components implemented in the StarODS priced reporting component 400.

Referring now to FIG. 8, there is shown the high-level logical approach of the StarODS data management system 400 integrated with the StarWRS component 200 of the nMCI Interact architecture. Generally, the data management system 400 of the invention, referred to herein as "StarODS", provides customers with priced reporting data pertaining to telecommunications services. Although the description herein pertains to priced billing data, it should be understood that the principles described herein could apply to any type of reporting data. Through StarWRS web-based reporting, the StarODS system provides priced reporting data and implements a DataMart approach for maintaining the data used for customer reporting. StarODS stores and incrementally processes customer's priced data included in call detail records, and loads this processed data in Data Marts in a manner such as described in commonly owned, co-pending U.S. patent application Ser. No. 09/159,402, entitled DATA WAREHOUSING INFRASTRUCTURE FOR WEB-BASED REPORTING TOOL, the contents and disclosure of which are incorporated by reference as if fully set forth herein. From these data marts customer's priced reporting data may be provided to customers on a daily basis via the StarWRS reporting system.

For priced reporting data, report categories from which a variety of reports can be generated include: a) Financial category—for providing priced data reports relating to longest calls, most expensive calls, Off Peak Calls, payphone report, usage summary, calling card summary, and area code summary for Toll Free, VNET, Vision, and CVNS customers; b) Marketing category—for providing priced data reports relating to country code summary, state summary, frequent numbers, frequent area code summary, frequent state, and frequent cities; c) Telecommunications category—for providing priced data reports relating to call duration summary, IDACC/Supp Code Summary and Call Access Summary for Toll Free, VNET, Vision, CVNS customers; d) Call Center report category—for providing priced data reports relating to most active toll free numbers, Hourly Distribution, Day of Week Distributions, state summary, and country code summary for their Toll Free, VNET, Vision, CVNS customers; e) Monitor Usage—for providing priced data reports relating to longest calls, most expensive calls, most active calling card and most active toll free numbers for their Toll Free, VNET, Vision, CVNS customers; f) Analyze Traffic—area code summary, country code summary, state summary, range summary, city summary, frequent numbers, payphone report, usage summary, calling card summary, IDACC/Supp Code Summary, Day of Week Distributions, Hourly Distribution, Call Access Summary and review calls; and, a g) Check Calling Frequencies category—for reporting on frequent numbers, frequent area code, frequent country codes, frequent state and frequent cities.

FIG. 8 illustrates the primary components implemented in the StarODS priced reporting data management component 400. As shown in FIG. 8, a first traffic feed 405 provides raw call detail records from external network switches, translates and sorts the data into billable records for input into two systems: a Commercial Billing system ("NCBS") mainframe server process 410 for pricing the records at tariff for customers subscribing to, e.g., MCI's VNET and Vision telecommunications products; and, a toll-free billing server process 420 for pricing the records at tariff for customers subscribing to toll—free telecommunications products. A common data gateway component 430 including a mainframe extract process 435 and a data harvesting process 440 receives these inputs on both a daily and monthly basis for processing. Particularly, the mainframe extract process 435 creates a selection table including all subscribing customers, compresses files for transmissions and extracts priced reporting records from the runstreams. The harvesting process 440 is responsible for performing data validations, filtering, data translations, data grouping, data routing, and data logging functions. According to a dimension table based on data within selected BDRs, the harvesting process applies business rules to the data, cleanses the data, transforms the data, creates load files for DataMarts and compresses files for storage in the DataMarts. The harvesting component 440 may additionally perform an aggregation function for supporting long term storage and rapid access of data for customer reporting, and performs trigger actions/events based on predefined criteria.

Additionally, as shown in the FIG. 8, other external systems and applications may interface with the common data gateway component 430 including: Cyclone Billing system 422a and Concert Virtual Network Services 422b which provide additional billing detail records; and, a calling area database 425 which provides geographical reference information, i.e., identify city, state and country information.

After the data has been processed in the Harvesting component 440 it is input to an operational data store component ("ODS") 450 that stores the billing detail records and dimension tables as a data model. This ODS layer 450 is comprised of all data harvested from all applications in the data harvesting layer 430, and feeds report-supporting DataMarts 470 in a manner which supports customized data access. The Datamarts may be engineered to pre-process data, create aggregates, and otherwise perform transformations on the data prior to DataMart loading 465 in order to implement a defined data model, e.g., star schema key structures, fact and dimension tables depicted as block 460. In the preferred embodiment, as shown in FIG. 8, the Operational Data Store 450 includes multiple datamarts 470 each for storing and retrieving daily and monthly priced data on a periodic basis. It primarily is responsible for hosting highly current data, typically at least 72 hours old. In accordance with customer-reporting needs, data marts 470 are partitioned in accordance with partitioning schemes which, in the invention, is based on customer-ID. Particularly, each DataMart is engineered for servicing specific customers or specific product sets, as well as engineered for the specific requirements of the customer/product such as high insert activity, heavy reporting requirements, etc. As data is volatile and changing and may not produce consistent results for the same query launched at multiple times, ODS is engineered for high performance through appropriate storage technologies and parallel processing. Although not shown, a common data warehouse is provided in this ODS layer that is responsible for performing storage, retrieval and archiving of data, typically of relaxed currency (e.g., more than 24 hours) and is targeted at trend analysis and detection. In the preferred embodiment, the datamarts utilize an Informix database in a star topology.

Figure 9:
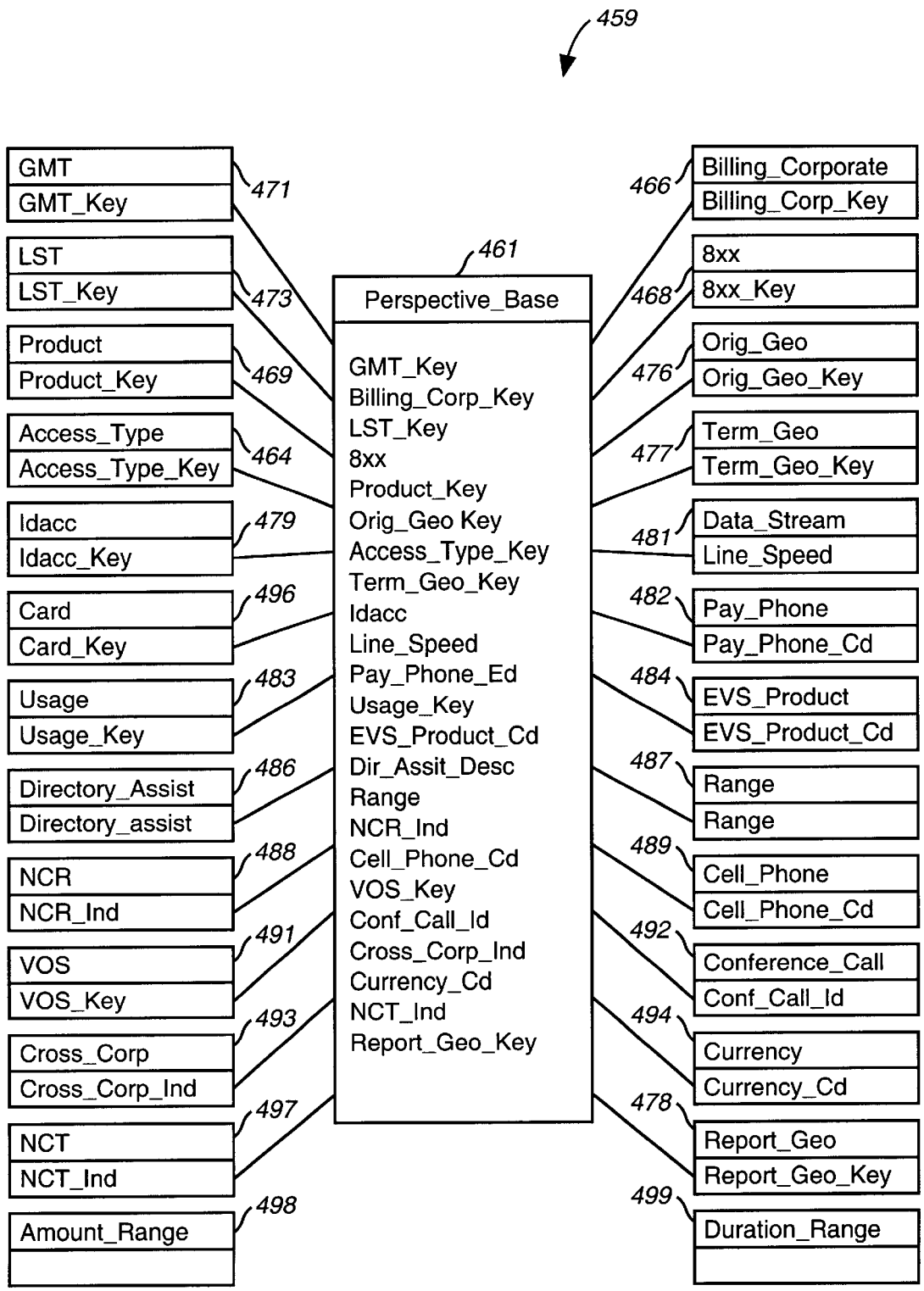
FIG. 9 illustrates the data model implemented for accessing information used in priced reporting system of nMCI Interact.

Particularly, as illustrated in FIG. 9, the data model 459 is one component comprising the priced reporting data store. In the preferred embodiment, the data model of StarODS is a dimensional or "star schema" model, including a central fact table multiply joined to a number of attendant tables known as dimensions. The relationships between the fact table and the dimensional tables are either enforced through keys, which may be generated, or as lookup codes. As shown in FIG. 9, the central fact table 461, referred to herein as "Perspective Base," provides access to a collection of attributes or facts concerning a call. The dimensional tables include the following: an Access Termination table 462 comprising data indicating whether a call was charged to recipient (inbound) or originator (outbound); an Access Type table 464 comprising data indicating the type of access (for outbound calls) or egress (for inbound calls) characteristics of a call; a Billing Corp table 466 comprising data indicating the hierarchical status of a customer for the purposes of billing charges for products and features; a Toll Free Number table 468 comprising data indicating any dialed number in which the three digits following the country code (1 for USA) is currently either 800 or 888; a Product Type table 469 comprising data indicating the product for which services are bundled for the purpose of invoicing; a GMT table 471 comprising date and time data adjusted to the Greenwich Mean Time Zone; a LST table 473 comprising date and time data adjusted to the local MCI switch which permitted access to the MCI network; an Orig_Geo table 476 comprising data indicating the geographic characteristics of a call's origination; a Term_Geo table 477 comprising data indicating the geographic characteristics of a call's termination; a Report Geo table 478 comprising data indicating the geographic characteristics of a call's origination or termination; an Idacc table 479 comprising data indicating a customer's defined id and/or accounting code; a Data Stream table 481 comprising data relating to the line speed characteristics of a data (non-voice) call; a Pay Phone table 482 comprising data denoting calls originating from a payphone; a Usage table 483 comprising data indicating the geographic attributes of a call which affect Tariff rates; an EVS Product table 484 comprising data representing Enhanced Voice Services products; a Directory Assistance table 486 comprising data indicating those calls requesting Directory assistance; a Range table 487 comprising data indicating distance bands a call may fall into; an NCR table 488 indicating Network Call Redirect calls; a Cell Phone table 489 comprising cellular call characteristics data; a VOS table 491 indicating Voice Operator Services calls; a Conference Call table 492 having data pertaining to characteristics of conference calls; a Cross Corp table 493 comprising data indicating inbound cross corporate routing of calls; a Currency table 494 indicating unit of currency for call prices; a card table 496 comprising data for billing calls to a location that may not be the one which originated the call an NCT table 497 comprising data representing Network Call Transfers; an Amount Range table 498 indicating call usage ranges based upon amounts; and, a Duration Range table 499 indicating call usage durations based on amounts. This star schema model is optimized for decision support and the retrieval of large amounts of data. Appendix H provides the data attributes of each of these dimension tables. As known, in the dimensional model, the grain of data stored in the fact table determines what level of data can be drilled down into. It should be understood that the grain of the data stored in the Perspective Base table is at the singular call level.

As described herein, from the data included in these data marts, one-time or recurring priced data reports are available for reporting through the NMCI Interact StarWRS reporting system 200.

Additionally, referring back to FIG. 8 there is provided a Decision Support Server ("DSS") reporting engine component 475 that performs the following functions: 1) receives various customer report requests from the StarWRS GUI Report Requestor component and accordingly generates database queries; 2) routes the query to the appropriate data marts 470, data warehouse or operational data store; and, 3) responds to the requestor with a formatted result set. The DSS server 475 may also perform cost estimation, agent scheduling, workflow broadcasting interface, and transaction logging functions. In the preferred embodiment, the DSS 475 is a cluster of DEC (Digital Equipment Corp.) UNIX 8400 servers running Information Advantage® software accessing an Informix database, e.g., Informix Dynamic Server V.7.3. database product, distributed across multiple Data Marts.

In accordance with the invention, the primary function of the DSS 475 is to generate priced billing report data in accordance with the customer's request which is received from the StarWRS reporting component as a metadata message. To accomplish this, the DSS interfaces with two StarWRS systems: Report Manager 250, and Inbox 270, as shown in FIG. 8. The Report Manager/Scheduler formats the customer's request in accordance with a defined set of rules and sends a metadata request message to the DSS. The DSS 475 reads the customer's metadata descriptions of the type of priced data report requested by a customer, translates the metadata into database queries, and implements commercial off-the-shelf ("COTS") tools such as Information Advantage's Decision Suite™ to generate SQL queries, and run the queries against the data in the DataMarts. Afterwards, the query results are formatted by a formatter process into a form readable by StarWRS report viewing components, and the completed reports are transmitted to the directory of the customer's Inbox, e.g., via FTP.

In the preferred embodiment, a publish-and-subscribe communications tool such as Talarian SmartSockets™ messaging middleware is used to coordinate report requests transmitted from the StarWRS report Manager to DSS, and report completion notification from DSS to the StarWRS Report Manager. The Report Manager formats the customer's request in accordance to a defined set of rules and sends the request to the DSS as a Talarian message with the Report Manager 250 maintaining the Talarian Sender program, and the Decision Support Server 475 maintaining the Talarian Receiver program. Messages are sent with guaranteed message delivery ("GMD"), thus assuring all request data sent by RM is received by the DSS. As known, Talarian messaging middleware defines a message as types and subjects. A message type is a structure that defines the format of the message. Message subjects are subsets of message types and describe messages by which Talarian receivers can subscribe. Conversely, message subjects describe messages by which Talarian senders publish.

Figure 10A:
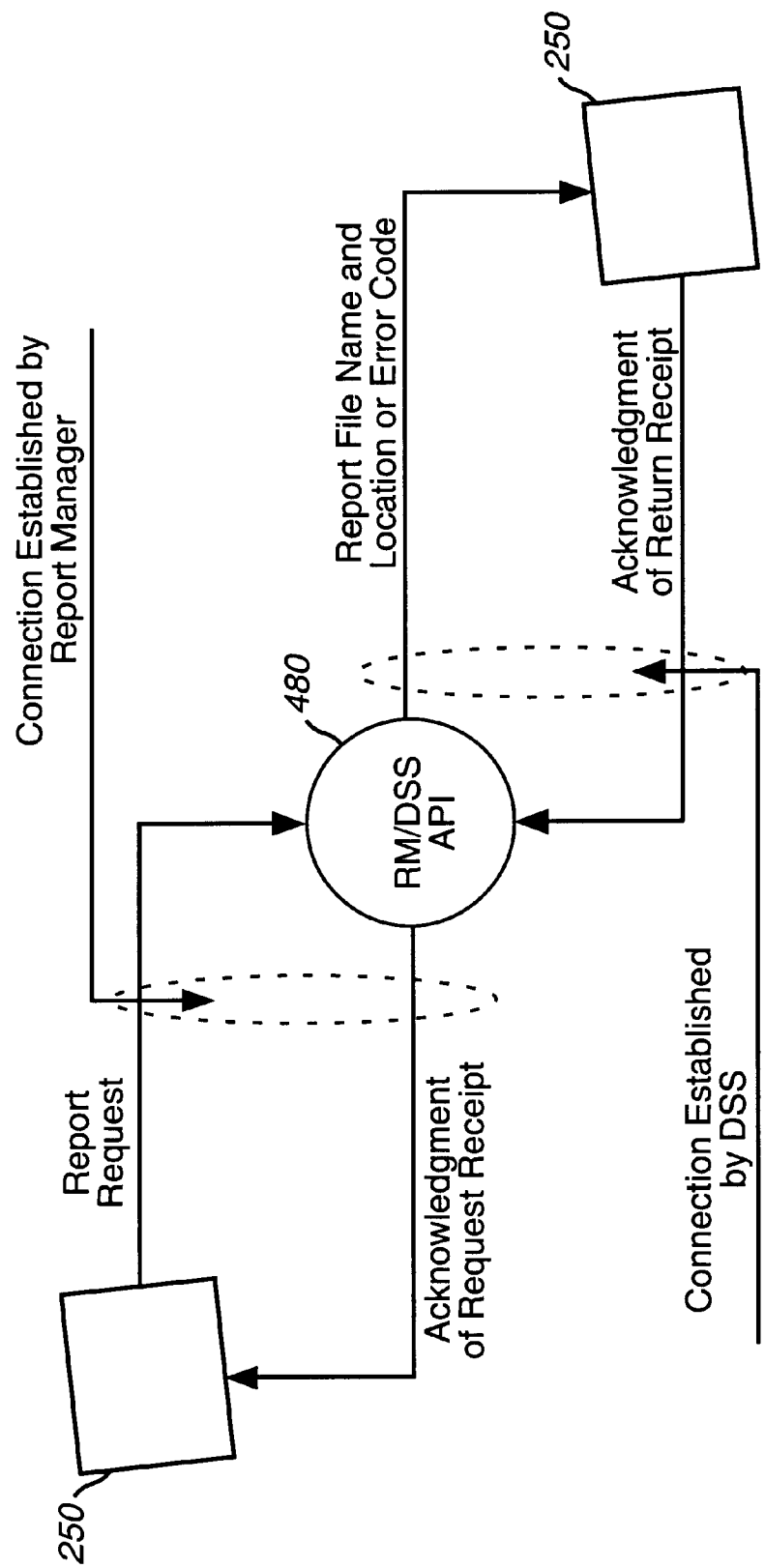
FIG. 10(a) illustrates the logical Report Manager/DSS application programming interface.
Figure 10B:
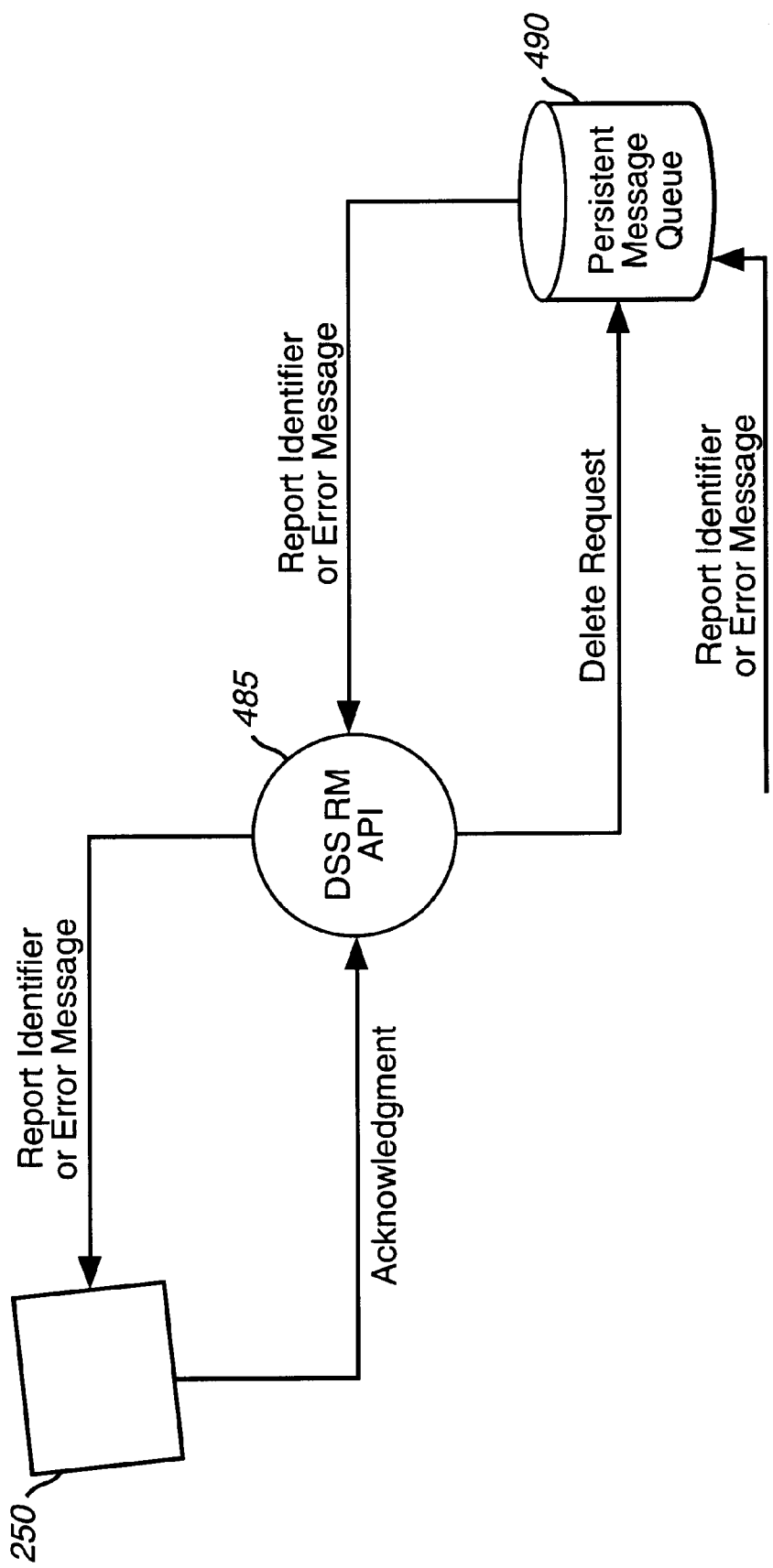
FIG. 10(b) illustrates the logical DSS/Report Manager application programming interface.

As depicted in greater detail in FIG. 10(*a*), a Report Manager/DSS application programming interface "API" 480 is provided whereby the RM server 250 publishes the message to the Decision Support Server in response to its receipt of a report request. Subsequently, the DSS 475 returns a "Message Received" message. When the DSS has processed the request, it publishes the message to the RM 250 with the name and location of the report file or an error message to the Report Manager, via an "NRL" metadata message as described herein.

FIG. 10(*b*) illustrates an DSS/Report Manager application programming interface "API" 485. In the preferred embodiment, all return messages are persistent. Thus, as shown in FIG. 8 the DSS incorporates a Talarian message queue 490 operating on a First-In-First-Out (FIFO) basis. If the DSS is unable to establish the connection with Talarian, or there is an error in transmission, the DSS queues all messages, and continues to retry until a successful send is executed.

Similarly, a DSS/Inbox API is provided to manage FTP file transmissions including: error handling, retry logic, and the ability to maintain the file name and location of where report files are stored. Particularly, the DSS/Inbox API sends the report file to the inbox (FIG. 8). If the DSS has generated an error condition, and the report is unable to be generated, an error message will be sent to the inbox in place of the report file. In either case, a return message will be delivered to the DSS/Report Manager API 485 indicating a successful or unsuccessful generation and transmission of the report file.

Figure 12A:
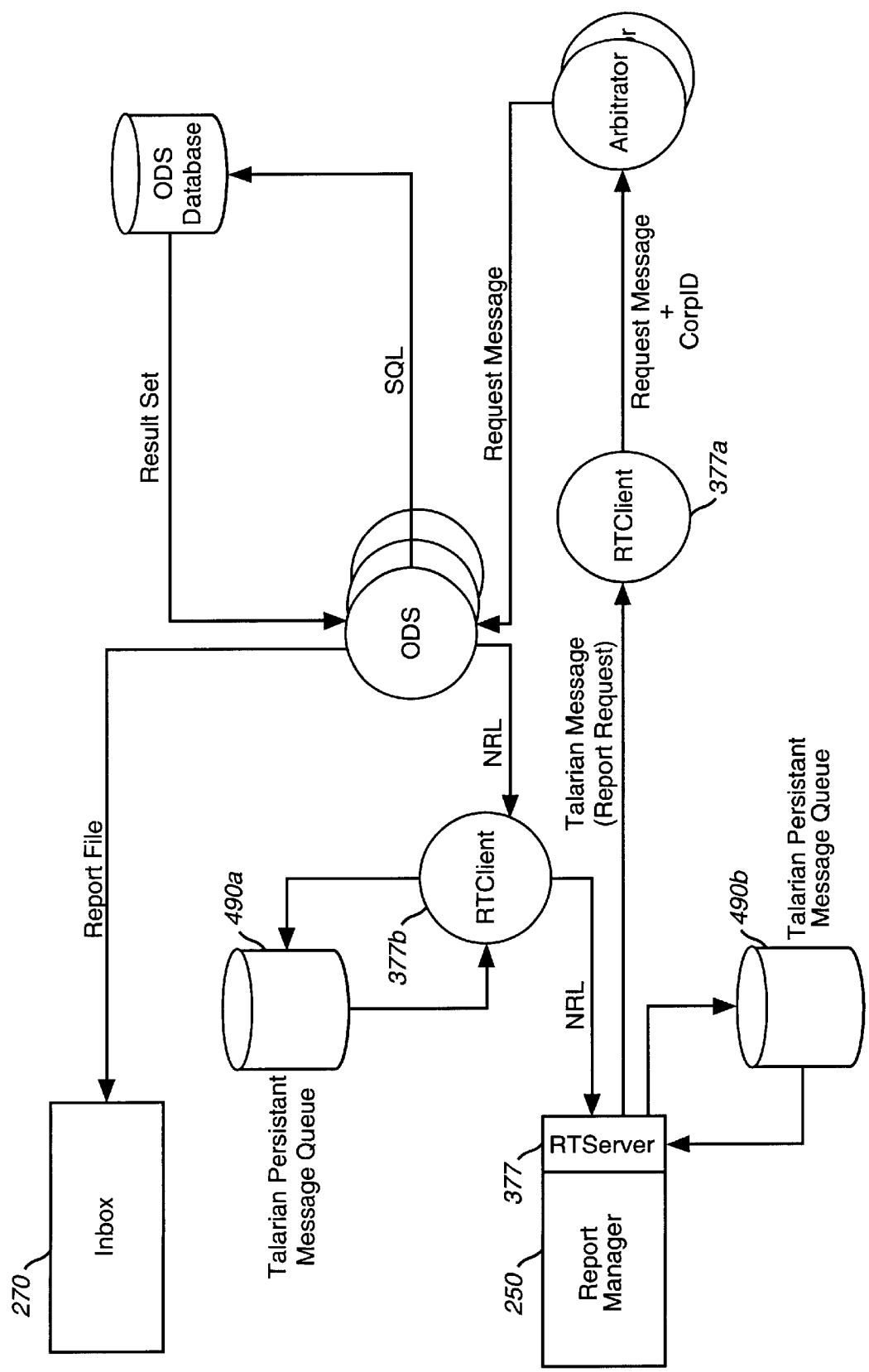
FIG. 12(a) illustrates an overview of the DSS connections enabling guaranteed message delivery in the nMCI Interact System.

More particularly, as shown in FIG. 12(*a*), an RTServer process 377 is provided for maintaining connections, ensuring guaranteed message delivery, and tracking the success of all messaging operations. As the Report Manager interfaces with multiple systems, the RTServer 377 processes are located in the RM. The DSS is provided with RTClient processes 377*a,b* that provides the API to RTServer: one RTClient 377*a* for providing the API to Report Manager for receiving messages; and, a second RTClient 377*b* for providing the API for the NRL. However, it should be understood that other ODS boxes can have one RTClient. The RM and Arbitrators 360*a,b* use the GMD feature of Talarian to deliver messages. RM/Inbox communication is not affected by outages of ODS server as the arbitrator and ODS communication is independent of RM/Inbox communication.

In the preferred embodiment, the DSS architecture is transparent to the Report Manager which publishes Talarian messages to which the DSS will subscribe. In addition to the tokenized character string request message which specifies report type, filters, and any customer request-specific information, RM server provides additional fields as part of the Talarian request message including: a Corp_ID, Priority, and RequestID. Corp_ID allows the DSS to route the request to the appropriate data store without having to invoke a parser. Data are partitioned on Corp_ID in the ODS database warehouse. Request_id is used to send back an ARDA failure message, in the event of an invalid message. The Priority field allows DSS to pickup the next high priority request from a queue of non-processed requests, without invoking the parser.

Figure 11A:
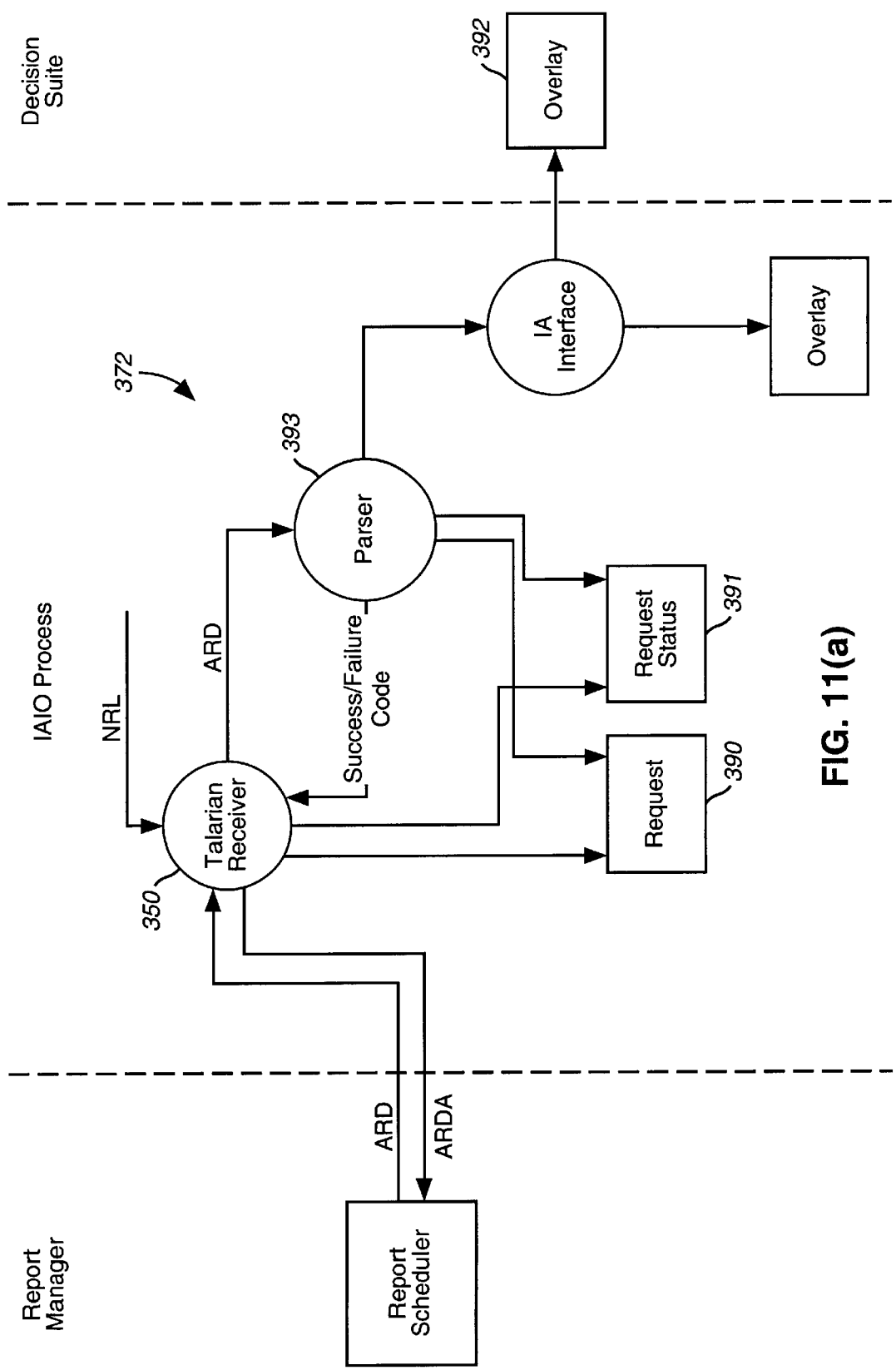
FIGS. 11(a)–11(b) illustrate an overview of the process performed by the DSS in routing a request.
Figure 11B:
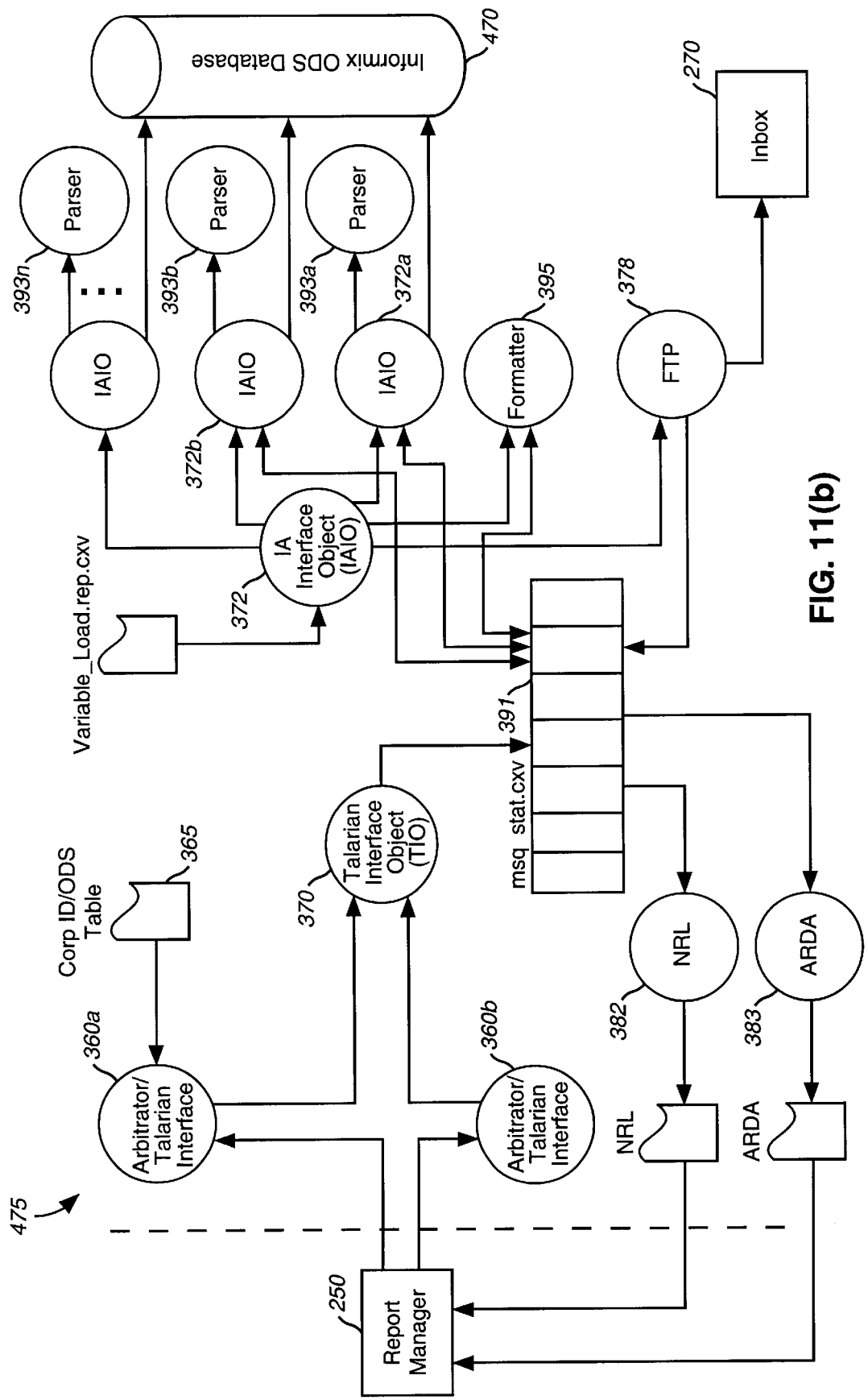

FIG. 11(b) illustrates the implementation of the COTS Information Advantage® Interface Object ("IAIO") 372, which is a process running in the DSS 475 for performing the following functions: 1) publishes and subscribes Talarian messages to Report Scheduler; 2) parses the request metadata ARD (Add Report Definition) message; 3) publishes an ARDA (Add Report Definition Acknowledgment); 4) populates a request table 390 with total, sub-total and sort information according to the received report request; 5) transforms the ARD tokens from the metadata request into an overlay file 392 which is a text file that is submitted to IA's Decision Suite™ process to generate the corresponding SQLs; 6) updates a Request Status table 391 with appropriate status, e.g., process complete, failed, in progress, etc.; and, 7) if a failure occurs, it updates an error log (not shown).

More particularly, in view of FIG. 11(b), ARD metadata request messages are received into the ODS system via arbitrator processes 360a,b which are responsible for routing the request message to the appropriate ODS database according to a Corp/ODS mapping table 365. Report Manager publishes a single message subject "Arbitrator" having the above-mentioned request, Corp_ID, and Priority field information. Report Manager uses a round robin message delivery mechanism complemented by Talarian's GMD to publish messages to the subject Arbitrator 360a,b. The arbitrator extracts the Corp_ID field from the message and maps the Corp_ID to corresponding ODS DataMart in the table 365 it maintains. The arbitrator then republishes the message with the ODS#. As shown in the FIG. 11(b), a second arbitrator process 360b is provided to assure failover capabilities.

In FIGS. 11(a) and 11(b), a Talarian receiver, referred to herein as a Talarian Interface Object ("TIO") 370, is a process that receives the Talarian message, manages the GMD functionality, and posts updates to the request table 390 and request status table 391. As shown in FIG. 11(b), the TIO receivers 370 subscribe to a subject "ODS#." The receiver inserts the message received from the arbitrator into the request table 390 and request status table 391 along with the priority, timestamp and status fields. The request status table resides on the ODS database and the messages are stored in the queue to provide queuing, log and tolerance from the failures. To determine the pending messages to be processed, status field and history_stat flags are used. Appendix "I" illustrates the contents of the ODS Request table 390 and Request Status tables 391, which are part of the ODS database.

In the preferred embodiment, the tables provided in Appendix I include: an "informix".request table 390 (FIG. 11(a)) which is the table maintained for the purpose of holding specific report request information from the received ARD message, and, an "informix".req_status for holding status of DSS processes for the current request.

Thus, for the example ARD message provided in Appendix I, the request table 390 will be populated to include: a "request_id," which is the unique identifier for the request; a "msg_desc," representing a copy of the ARD message; "unique_fname," which is the unique name assigned to each request to enable tracking of individual report requests and is additionally assigned to the report returned to the report manager; a "report_dir" indicating the location of the report that Decision Suite™ generates (which may be a tab delimited report file); "format_dir" indicating the location where the report formatter generates (comma delimited file); "inbox_dir" indicating the location on the Inbox (Report Manager) where the report is sent; "inbox_fsize" indicating the size of the file; "entpid," indicating the Enterprise id which may consist of one or more corporate id's; "userid" which is an identifier assigned to each user of the system; "stdrptid" which identifies each report and is similar to column id's but on the report level; "userptid" which is the user-assigned identifier for a report request; "compress" having possible values '1'=yes, '1'=no indicating if a report is to be compressed, e.g., using a standard .zip routine; "threshold" defining the number of lines that shall appear on the report; "totalmode" which defines how the report shall be totaled, subtotaled as indicated by possible values '0'=No total, No subtotal; '1'=Only Subtotal; '2'=Only Total; '3'= Total and Subtotal; "nrl_totals" indicating the formatter to total the columns specified in the "*.hdr" file. These columns are numeric and have a subtotal flag='y' in a column id table; "format_columns" which define derived columns on which percentages are to be calculated; "error_code" for indicating parser failure or system failure. If it's a parser failure condition, the code is returned to Report Manager; "error_desc" indicating the error description; and, "rpmgr_columns" which are the columns sent to the DSS by Report Manager. The formatter checks this list against the list in the .hdr file.

Similarly, the Request_Status table 391 provided in Appendix I is populated to include the status of the different processes including: "Request_Id," i.e., the unique identifier for the request, "Priority," e.g., having a value of "1," for example, meaning adhoc; a "timestamp" which is the Informix Date Time that will be used when two or more messages have same priority; and "Status" which is a char message including the following status fields: "new_message" indicating that a new message has arrived, yet to be processed; "in_IAIO" status indicating that the message is being processed by interface process IAIO; "parser_failed" status indicating an Invalid message from RM. NRL process sends a ARDA error message; "parser_success" status indicating that the message from RM is a valid message. NRL process would send a ARDA message to RM; "IAIO_complete" status indicating that the report has been generated and directory and file name fields are modified. Formatter can pick up this message; "IAIO_failed" status indicating that IA has failed to generate a report, i.e., an error has occurred generating a report; "in_formatter" status indicating that the formatter is converting the text file generated by IA to a comma delimited format. The formatter may also, if required, does the percent (%) calculations, e.g., subtotals etc.; "format_success" status indicating that the formatter successfully completed translation of the file. It also populates the inbox file name, inbox file directory, nrltotal (optional) fields in the table; "format_failed" status indicating that the formatter failed to translate the text file generated by IA; "in_ftp". status indicating that the ftp process is currently sending the file to inbox; "ftp_success" status indicating that the file generated by formatter is ftp'd to inbox; "ftp_failed" status indicating that the formatted file could not be ftped to inbox; "in_NRL" status indicating that the NRL process is trying to send either ARDA message or NRL message to RM; "NRL_sent" status and "ARDA-sent" status indicating that the respective NRL or ARDA message has been sent to RM. Each DSS process updates the request status table as it processes.

A further "history_stat" field may be provided in the request_status table 391 having a value, e.g., 'A' (Active) indicating that the record needs to be processed, or, indicating 'H' (History), when the record is no longer active and needs to be archived in a separate database set up for archival purposes (not shown).

As further shown in Appendix I, there are two more tables that are defined for DSS sorting and formatting processes: a Column ID Table, and a Translation table which are tables configured for the formatter process, as will be described.

As further shown in FIG. 11(b), in operation, each Information Advantage® Interface Object ("IAIO") 372a,b, . . . n reads the status table 391 for new entries. When a new entry is posted, it invokes a parser process 393, and invokes the Information Advantage® SQL generator engine which retrieves the requested data from the database, and updates the status table 391.

Particularly, the Decision Suite™ tool receives the overlay file (FIG. 11(a)) and performs the following functions: 1) generates SQL; 2) submits the SQL to the appropriate datamart (ODS database); 3) generates a Report file with a *.txt extension; 4) updates Request Status table 391 with appropriate status; and, 5) if a failure occurs, updates the error log. Following generation of the *txt file, a sort process is invoked to perform the following functions: 1) reads the Request table 390 for column(s) on which to sort the Report; 2) reads the *.txt file; 3) sorts the *.txt file and generates two files: i. a file with a *.hdr extension which file contains the header information, consisting only of only column id's, and, ii. a file with a *.data extension which file contains sorted data provided in the *.txt file and is the body of the Report; 4) it further updates the request status table with a 'success' or 'failure' code; and, 5) if a failure occurs, updates the error log.

As further shown in FIG. 11(b), continuously running FTP, NRL and ARDA processes are provided to take appropriate actions in accordance with the request status table entries. For example, an FTP process 378 performs the following functions: 1) reads the status table 391 for entries ready to be sent to the Inbox and FTP's the .csv or .txt to the inbox 270; 2) Determines success or failure of file transfer; 3) Updates the Request Status table 391; and, if a failure occurs, updates an error log.

The NRL (Notification of Report Location) process 382 performs the following functions: 1) reads the Request Status table 391 for any success status or failure of any process; 2) Invokes a receiver process with appropriate status and file location populated in the NRL; and, 3) If failure occurs, updates the error log. Particularly, should an error occur in any of the DSS processes, an error log is updated. Error log directories may be delineated by process and day of week. Each new error generated by the same process in the same day appends the log with the new message. In either event, the NRL process returns the NRL message to Report manager indicating the status and location of any generated files.

As further shown in FIG. 11(b), an ARDA process 383 reads the status table 391 for parser failures. Should the parser fail due to insufficient or missing data, ARDA process will return an ARDA message to the Report Manager with the appropriate error code. In particular, the types of conditions that result in error messages being sent to the report manager and/or local log include: i) when the request message received from the Report Manager can not be parsed due to bad data or invalid format; ii) when the SQL can not be generated due to invalid request format or parameters; iii) system or process failure; iv) cannot query database due to a database failure; etc.

Figure 13A:
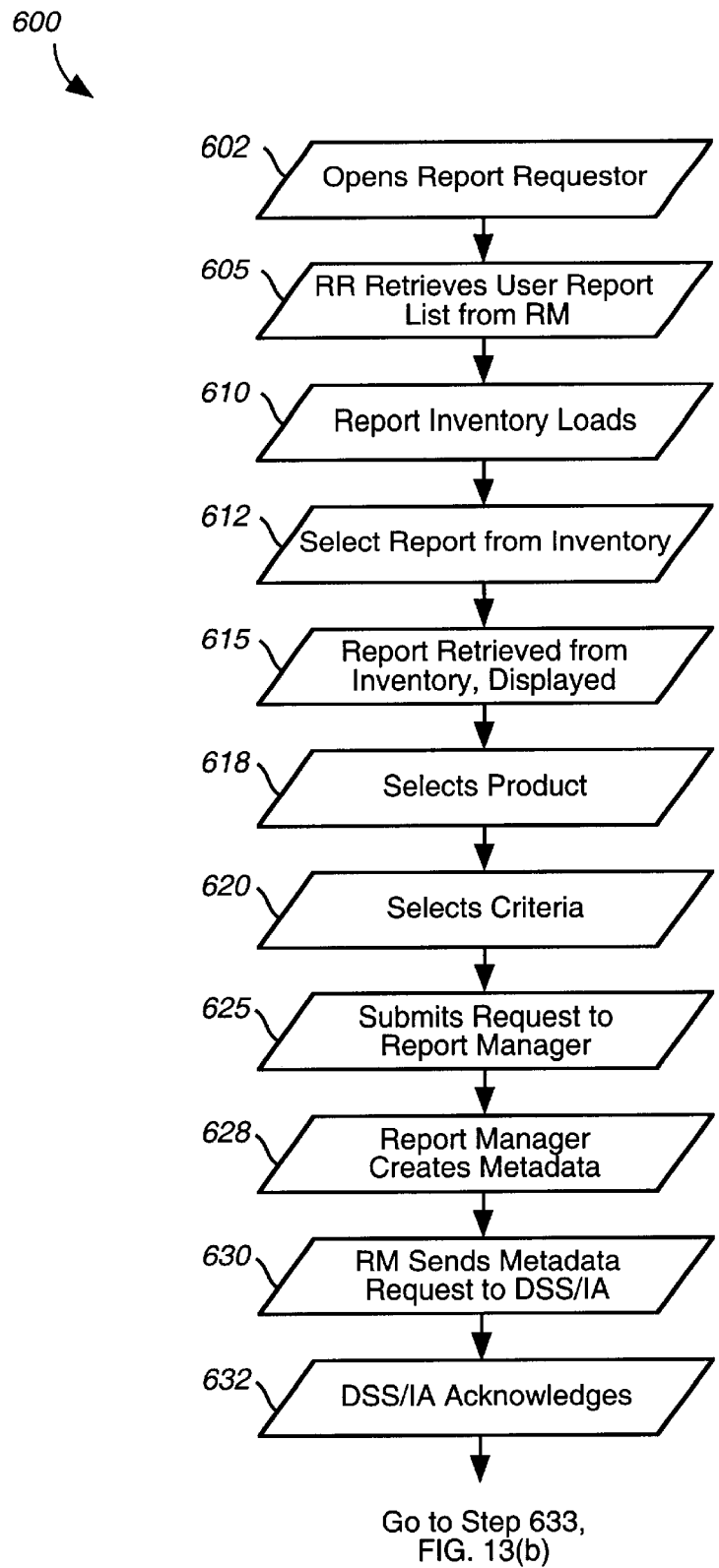

For Priced Reporting, the StarWRS report requestor functionality is invoked as described in above-referenced, co-pending U.S. patent application Ser. No. 09/159,409. Particularly, the end-to-end process 600 from a priced report request to report delivery is shown in FIGS. 13(a)–13(c).

Specifically, a user first establishes communication with the DMZ Web server 44 and logs on to the nMCI Interact system by entering the user's name and password onto a logon dialog box. Then, an application running on the backplane directs a "Validate User Message" common object to the StarOE server 280 via the web server and dispatcher servers (FIG. 3) to direct the StarOE server 280 to perform security validation and authenticate the user ID and password in the manner as described in commonly owned, co-pending U.S. patent application Ser. No. 09/159,514, now allowed, entitled AUTHENTICATION AND ENTITLEMENT OF WEB BASED DATA MANAGEMENT PROGRAMS, the contents and disclosure of which is incorporated by reference herein. It is understood that all communication to the StarOE server is via TCP/IP with a Unix process listening on a known TCP port. The StarOE server acts as a proxy when messages are sent from the Dispatcher server 46 and supports synchronous transactions. All data and security information is accessed by direct queries to a StarOE server database 283, such as provided by Informix. Once a user is logged on, the Web Server 44 (FIGS. 3 and 7) requests a current list of authorized applications from the StarOE server 285. Particularly, as described in co-pending U.S. patent application Ser. No. 09/159,408, the contents and disclosure of which is incorporated by reference herein, a "Get User Application Request" message is communicated to the StarOE server via the backplane from the report requester which queries the Informix database to obtain a list of authorized applications, i.e., services, for the user and which determines which buttons on the home page are active, thus controlling their access to products. This information is downloaded by a GUI applet that is executed via the Backplane (FIG. 4) and incorporated into the home page that is presented to the user. An exemplary home page screen display 80 is shown in FIG. 5 which provides a list of icons 70 representing the possible options available to the user according to that customer's entitlements.

Appendix H of co-pending U.S. patent application Ser. No. 09/159,409 provides the format and content of the nMCI Interact common objects downloaded to the Report Requestor client application to enable web-based reporting. As shown in above-referenced Appendix H, the Report Requestor first asks for common objects for a user's default timezone, language and currency. The Report Requestor objects are invoked to retrieve from StarOE the various customer entitlements relating to security, geographical hierarchy, billing hierarchy, and paging and e-mail notification, as further shown in Appendix H.

In response to selection of the Report Requestor icon, a display is generated to present the reporting options to a user in accordance with that user's entitlements as previously determined. It should be understood that in the preferred embodiment, the icons for applications the user has security access to are shown bolded. Thus, for a customer subscribing to nMCI Interact Priced Reporting, a Priced Reporting icon is automatically enabled when the home page appears.

Thus, upon selection of a Report Requestor icon 76 from the home page screen display 80 of FIG. 5, a StarWRS report requestor web page is presented to the customer. The backplane object allows the user access to the Report Requestor front end if the user is so authorized, and a client priced reporting application is downloaded to the customer who is presented with the Priced reporting dialog screen (not shown), as indicated at step 602 in FIG. 13(a). It is from this screen that the user is presented with priced reporting options to view/retrieve completed reports via the StarWRS Inbox, or create a new report or, modify an existing Priced call detail data report.

Particularly, from the Priced reporting dialog screen, the user is enabled to edit an existing report maintained in the report manager inventory, generate a new report, copy an existing report, or delete an existing report. For example, as indicated at step 605 (FIG. 13(*a*)), a user may initiate retrieval of the user report list containing existing user reports from the RM inventory, which process entails invoking the Report Requestor to initiate generation of a metadata request to download the report inventory from RM as indicated at step 610. The Report inventory for the specific user is loaded and displayed for the user on the user report request display screen, enabling the user to select a report, as indicated at step 612. Then, at step 615, the selected report is retrieved from StarWRS Report Manager and displayed for the customer.

Then, as indicated at steps 618 and 620, the customer may enter the desired reporting options and reporting criteria including: 1) the report product including toll-free, MCI Vision, and MCI Vnet options; 2) the report category which includes options for: analyzing traffic, call center, call detail, checking calling frequencies, financial, marketing, monitoring usage, and telecommunications categories for toll-free, Vnet and Vision customers; 3) the report type which includes priced call detail data or traffic data options; and 4) a report direction and which includes inbound, outbound, or both directions. Additionally, the user may select the report format associated with a reporting category.

Whether creating a new report or editing an existing report, the user is enabled to select customization options from successive dialog screens (not shown) that are presented to the user showing all the report customization categories for building a new report and/or editing an existing report. From this screen and related report building dialog boxes, all of the initial values for retrieving the MetaData, customization options and GUI builder options from the report manager server 250 necessary to build (edit) a report are provided in accordance with the user's entitlements. As described in greater detail in co-pending U.S. patent application Ser. No. 09/159,409, a user may provide the following customization and report builder options: general customization options; layout customization options; access customization options; hierarchy customization options; geographic customization options; and, notification customization options.

In performing the report request process, as shown in FIG. 7, the Report Requestor client application 212 gains access to the Metadata stored at the Report Manager server 250 through messaging, as indicated at step 625. Particularly, as hereinafter described, a message generated by the Report Requestor in accordance with the user request is first received by the report manager proxy 250'. In the preferred embodiment, the report manager proxy comprises a set of tools in the form of reusable objects, preferably written in C++ code, or the like. For example, a parser object tool is employed to decompose the Metadata messages sent by the report requester 212 to validate the message. If errors are found in the Metadata input, the RM will return an error message to the requesting client. If the Metadata passes the validation tests, the request type is then determined and the appropriate service will be invoked after which a standard response is sent back to the requesting client or and/or fulfilling server.

The Report Manager 250 implements stored procedures to translate the message, perform the request, and send the information back to the Report Requestor 212 which uses the metadata to determine what a standard report should look like, the customization options the user has, and the types of screens that should be used for the various options (i.e., single selection, multiple selections, etc.). It is understood that the selection of available standard template reports is based on the user's entitlements.

The following list provides the types of requests that may be initiated by the Report Requestor 212 and the responses performed by the Report Manager 250: 1) Get/Send report template list (GRTL/SRTL)—which request retrieves the list of all standard report templates for all products and is used only to obtain general report information, e.g., report title, description, etc.; 2) Get/Send report template detail (GRTD/SRTD)—which request retrieves the details of a specific standard report template; 3) Get/Send user report list (GURL/SURL)—which request retrieves the list of all user reports for the report format selected from a user report table and is used only as a request for general report information, e.g., report title, status, etc.; 4) Get/Send user report detail (GURD/SURD)—which request retrieves the details of a specific user's report; 5) Add report definition/Acknowledgment (ARD/ARDA)—which requests addition of a user-created report to a user report table. If the report is a scheduled report, this request is also communicated to the fulfilling server at the time the report is due; 6) Delete report definition/Acknowledgment (DRD/DRDA)—which request deletes a user-created report from the user table; 7) Copy report definition/Acknowledgment (CRD/CRDA)—which request creates a duplication of the report the user is editing (other than the report title) and creates a new report ID for it; 8) Update Reporting Schedule/Acknowledgment (URS/URSA)—which request updates the scheduling information on a report without having to send a Delete and Add request; and, 9) Get Pick List/Acknowledgment (GPL/GPLA)—which request enables the Report Requestor 212 to get a pick list provided by StarOE server.

In a preferred embodiment, as shown in Table 1, the interface message sent to the RM server 250 from the report requester via the Dispatcher server 46 comprises a three to four character message acronym followed by request specific parameters.

TABLE 1

| Parameter Name | Parameter Type | Required | Acceptable Value |
|---|---|---|---|
| Request | 3 or 4 Characters | Yes | Msg acronym |
| Data parms . . . | Characters | No | |

Table 2 illustrates the interface message format returned by the RM server 250.

TABLE 2

| Parameter Name | Parameter Type | Required | Acceptable Value |
|---|---|---|---|
| Response | Char (4) | Yes | Msg acronym |
| Error Code | Char (4) | Yes | 0 = OK or error |
| Data parms . . . | Char # | No | |

As shown in Table 2, the response message to be returned in Metadata format preferably includes a four character message acronym followed by an error code. A successful request (or a request acknowledgment) generates a response with an error code of "0". Additional data specific to the response follows this error code. If any server receives a message which is not known, the response message will echo the message acronym back along with an appropriate error code.

Appendix A provides a series of tables containing the content for each metadata message request that can be sent by the report requester 212 for each of the enumerated user requests, in addition to the content of the corresponding metadata message responses by the RM server 250. As an example, when a user requests a list of all standard report templates that can be created for a specified product, category, and product type, e.g., toll free unpriced data, an example metadata format is as follows:

GRTL<PRODUCT=V,DATATYPE=R,DATACAT=P,IO=O> where GRTL is the message name, the PRODUCT indicates the product type, e.g., V=Vnet, C=CVNS, S=Vision, T=toll free, F=Traffic view, etc. DATATYPE indicates the data type, e.g. R=reports, D=call detail, etc., and DATACAT represents the report category, e.g., P=priced, U=unpriced.

In the hereinafter described manner, the GRTL message is received by the StarWRS proxy server application 250' to enable the RM server 250 to perform the query into the RM Informix database having the data associated with the request. Specifically, after selecting the Report Requester from the browser or the Toolbar, a WRSApp object is launched. At its creation, the WRSApp object creates a DataManager object to guide the data and which initiates a CommunicationManager object to manage all communication between the client and the server. The CommunicationManager utilizes a RptManagerMsg object to create: 1) a GRTL; 2) a WRSCommWrapper for direct communication with the backend; and, 3) a WRSReportManagerUtilParser to format the data returned. In response, the Report Manager creates a Dispatcher object, which contains the business logic for handling metadata messages at the back-end and utilizes the services of a RMParser class. Upon determining that the client has sent a valid message, the appropriate member function is invoked to service the request. Upon receiving the message, the Report Manager creates the Parser object (RMParser) which takes the message apart and invokes a validation object which validates the message.

In response to the GRTL message, the data returned by the Report Manager server 250 for this particular request may include the following data in metadata format as follows:

SRTL<ERROR=0, REPORTS = <RptCategoryDescription1 =<RptTitle1.1, RptTemplateID1.1, RptCategoryType1.1>, <RptTitle1.2, RptTemplateID1.2, RptCategoryType1.2>>, <RptCategoryDescription2 =<RptTitle2.1, RptTemplateID2.1, RptCategoryType2.1>, <RptTitle2.2, RptTemplateID2.2, RptCategoryType2.2 >>, . . . <RptCategoryDescription#n=<RptTitle#n.n, RptTemplateID#n.n, RptCategoryType#n.n>, <RptTitle#n.n, RptTemplateID#n.n, RptCategoryType#n.n>>> wherein RptID# indicates a standard report template ID, RptTitle# indicates the standard report template title, RptCategory# indicates the report category, e.g. Monitor Usage, Analysis Traffic, Historical, Executive Summary, Call Detail, etc.; and, RptDescript indicates the standard report template description displayed to the user. Thus, for each Report Template Category, there will be the list of reports with each entry containing a Report Template Title, a Report Template Description and the Report Template ID.

The SRTL message is sent from the StarWRS RM proxy server to the report requestor for presentation to the customer. Specifically, the SRTL response is built inside the esql wrapper function after obtaining the necessary information through the stored procedure from the Report Manager Informix database. The Report Manager creates the RMServerSocket object and sends the SRTL message back to the client.

To retrieve details of the standard report template, the GRTD request message request is sent having content shown in the table in Appendix A. When specified, the Report ID field indicates an existing report that a user may wish to edit.

The SRTD response generated by the RM server is formatted in metadata as follows:

< Report Template ID=ID#,

NODE1=<node level1, label value1, assigned unique screen identification1, >,

NODE2=<node level2, label value2, assigned unique screen identification2, <control ID2.1, field value2.1, data location2.1>, <control ID2.2, field value2.2, data location2.2>, <..,..,..>>, NODE#n=<node level#n, label value#n, assigned unique screen identification#n, <control ID#n.1, field value#n.1, data location#n.1>, <control ID#n.2, field value#n.2, data location#n.2>>

In the SRTD message, the MetaTreeData Label fields include such values as General, Report Name, Report Description, Scheduled Execution, etc. The MetaCtrlInfo MetaField Value fields may be blank or may contain the selection options available to the user. This information is taken from the report template database.

As another example, when a report request is submitted to retrieve a full list of user created reports from a user report table, i.e., a template list for a particular report product, category, and type, the example metadata format is as follows:

GURL<USERID=jeanvnet2,RPTTMPID=1,ENTPID=00022924,PRODUCT =T,DATACAT=U> with UserID and ReportTemplateID fields specified. Specifically, this process entails invoking the Communication Manager object to communicate with the RM server in order to obtain a SURL metadata message. The CommunicationManager utilizes the RptManagerMsg object to create: 1) a GURL, 2) a WRSCommWrapper for direct communication with the backend, and, 3) a WRSReportManagerUtilParser to format the data returned. The parser returns a hash table containing the User Report List. At the RM server, the Report Manager creates an Dispatcher object that contains the business logic for handling metadata messages at the back-end and utilizes the services of the RMParser class. Upon determining that the client has sent a valid message, the appropriate member function is invoked to service the request. The Report Manager, upon receiving a message, creates a Parser object (RMParser) which takes the message apart and invokes a validation object which validates the message.

In response to the GURL request, the data returned is taken from a user report table in the RM server database. The generic SURL message in Metadata format returned by the RM server 250 includes the following information:

REPORTS = <UserRptCategory1 = <UserRptTitle1, UserRptID1, activeflag, report type, statusdate >>, <UserRptCategory2 = <UserRptTitle2, UserRptID2, activeflag, report type, statusdate>>, . . . <UserRptCategory#n = <UserRptTitle#n, UserRptID#n, activeflag, report type, statusdate>>> wherein for each user report category, there is a list of reports where each entry contains a UserRptID# indicating a user-defined report template ID, a UserRptTitle# indicating the user's report template title, and a UserRptCategory# indicating the user report category. Specifically, the SURL response is built inside an esql wrapper function after obtaining the necessary information through a stored procedure from the Informix database. The Report Manager creates the RMServerSocket object and sends the SURL message back to the client.

To retrieve the details of a specific user's report, the GURD message is sent having data as contained in the table shown in Appendix A. Specifically, when the user selects a report from the Inventory List on the Report Requestor, a Communication Manager object is invoked to communicate with the RM server in order to obtain a SURD metadata message. The CommunicationManager object first utilizes the RptManagerMsg object to create: 1) a GURD metadata message, 2) a WRSCommWrapper for direct communication with the backend, and 3) the RSReportManagerUtilParser to format the data returned. The parser organizes the data into a series of nodes which are utilized to create the report builder tree on the report requestor customization screen. Later this data will be extracted from the node and used to construct the screen related to the node. The Report Manager server creates the MCIDispatcher object which contains the business logic for handling metadata messages at the back-end and utilizes the services of the RMParser class. Upon determining that the client has sent a valid message, the appropriate member function is invoked to service the request. The Report Manager, upon receiving a message, creates the Parser object (RMParser) which takes the message apart, invokes a validation object which validates the message and builds a response inside the esql wrapper function after obtaining the necessary information through the stored procedure from the Informix database. The Report Manager creates the RMServerSocket object and sends the SURD/SRTD message back to the client. The responsive SURD metadata message corresponding to a retrieve user report detail (GURD) request has the following metadata syntax:

< Report Template ID=ID#,
NODE1=<node level1, label value1, assigned unique screen identification1, >,
NODE2=<node level2, label value2, assigned unique screen identification2, <control ID2.1, field value2.1, data location2.1>, <control ID2.2, field value2.2, data location2.2>, <..,..,..>>,
NODE#n=<node level#n, label value#n, assigned unique screen identification#n, <control ID#n.1, field value#n.1, data location#n.1>, <control ID#n.2, field value#n.2, data location#n.2>, <..,..,..>>, This response thus may include the report information having detailed items including: UserReportID (UserID), User's report name (UserName), product (UserProd), Threshold (UserThreshold), User Report Description (UserDescript), Report Columns (UserFields), Report column headings (UserHeaders), and, in addition, customization options with fields indicating, inter alia, columns to display (UserHeaders), user-defined criteria (UserCriteria), a sort order (UserOrder) and scheduling selections (UserSched), the last update of this report (UserLastUpdate) and, the Report status (if adhoc) (UserStatus), etc.

If a request is made to add a user-created report to a User_report table maintained by the RM Server 250 and the RS server 260, the ARD metadata message having fields defined in the table provided in Appendix A is processed by the RM server 250, as indicated at step 628, FIG. 13(a). An example message in metadata format to initiate the addition of a user-created report for ODS (Inbound/Outbound) reporting data is as follows:

ARD<USERID=jeanvnet2,ENTPID=00022924, STDRPTID=90,NAME=Ci ty Summary Outbound, PRODUCT=S,CATEGORY=Analyze Traffic, THRESHOLD=<RECCOUNT=20>,SCHEDULE= A<START=199806020000,EN D=199807151200>, RANGETYPE=1,SCHEDTYPE=A,TIMEZONE=45, BILL ING=INBOUND<<90000003,90000003><NA, NA><NA,NA>>INBOUND<<9 0000004, 90000004><NA,NA><NA,NA>>,CARDNO= <654654*~5465465 465465465>,IDAC= <46546546*~1246>,GEO=GEO<<001,001USA/ WORLDZONE1><NA,NA><NA,NA><NA, NA><NA,NA>>GEO<<001,001USA/ WORLDZONE1><CO,CO><NA,NA><NA, NA><NA,NA>>,OACCESS=<4~1>,ODISTRANGE= <A~F>,OUSAGE=<5~4>,SORTBY=<54D>, DESCRIPTIO N=This report summarizes call detail by the terminating city and state (USA) / province (CA). The report is based on the date/time ranges and report criteria selected.,COLUMNS= <54~55~67~62~36~61~58~63~64~66~65>,ACT IVE=1,TOTALMODE=0,EMAIL=0,PAGE=0, LANG=1234, CURR=2345>

In this example, the "NAME" field refers to the Report Name (e.g., city summary); the "PRODUCT" field refers to the report product (Vision); the "THRESHOLD" field refers to the record count; the "DESCRIPTION" field refers to the report description; the "COLUMNS" refers to the number of columns specified for a report by the user; the "BILLING" field refers to the specified report billing entitlement, i.e., billing hierarchy; the "IACCESS" field refers to the inbound access type and the "OACCESS" refers to the outbound access; the "SORTBY" field indicates the report column sorting customization with "A" indicating column(s) having data to be sorted in ascending order and, "D" indicating column(s) having data to be sorted in descending order; the "SCHEDULE" field referring to the scheduling type, e.g., with "A" indicating an ad-hoc report, and the user specified date range on which to report as indicated by the "START" and "END" fields, and additionally, the scheduling frequency information in the case of a recurring report; the SUBTOTALCOLUMNS field, referring to the report columns having data to be subtotaled; and, the "EMAIL" and "PAGE" fields indicating reporting notification via e-mail or paging, respectively.

Furthermore, for each of the metadata messages in Appendix A, including the Delete Report Definition (DRD), copy report definition (CRD), and update report scheduling (URS) messages, the report manager server 250 responds to the Report Requestor with the processing results. In the case of a copy report, a new User Report ID is assigned and returned by RM. When editing an existing StarODS (priced call data) report, the user may make changes to the Report Title, the Report Description, the Report scheduling, the 800 numbers and thresholds, and may customize number of rows, report columns, access codes, access types, billing location, geographic location, paging notification, and e-mail notification. More specifically, when the user selects a report from the inventory list or a new report, an WRSEdit Screen is launched to provide the editing capabilities which are available for the report format. WRSedit guides the screens through the process of retrieving the screens' data. Some of the screens need data which has not yet been retrieved, such as 800 numbers or geographic locations. These screens manage the requests to the DataManager object to create the get pick list (GPL) message (Appendix A), which launches the CommunicationManager object to perform this task. The CommunicationManager utilizes the RptManagerMsg object to create the GPL, the WRSCommwrapper for direct communication with the backend, and the WRSReportManagerUtilParser to format the data returned. In response, the Report Manager server creates the MCIDispatcher object and invokes the MCIRMParser class. Upon determining that the client has sent a valid message, the appropriate member function is invoked to service the request. The Report Manager, upon receiving a message, creates the Parser object (RMParser) which takes the message apart and a validation object is invoked which validates the message. The response is built inside the esql wrapper function after obtaining the necessary information through the stored procedure from the Informix database. The Report Manager creates the RMServerSocket object and sends the GPLA message back to the client.

Having described the functionality of selecting and/or generating a report and customizing it, reference is now had to the process for running the report request in StarODS. Particularly, in the preferred embodiment, the user may select a save and exit report option, or a save and run report option. In either scenario, an WRSEdit object enables a WRSScnMgr object to save the report to the RM server. The WRSScnMgr object launches each screens save method which communicates with the DataManager object to place the screens data in its corresponding WRSNode. Once all of the WRSNode objects have been updated, the WRSScnMgr object calls the DataManager object's SaveReport method to build a hash table to contain all of the report's data. The CommunicationManager utilizes the RptManagerMsg object to create the ARD metadata message from the hash table, the WRSCommwrapper for direct communication with the backend, and the WRSReportManagerUtilParser to handle any errors thrown by the server. The Report Manager creates the Dispatcher object, and utilizes the services of the RMParser class and validation objects. Upon determining that the client has sent a valid message, the appropriate member function is invoked to service the request. The response is built inside the esql wrapper function after obtaining the necessary information through the stored procedure from the RM database. The Report Manager creates the RMServerSocket object and sends the ARDA message back to the client.

As illustrated in FIG. 13(a), at step 630, in reference to user selection of a Save and Run report option, the report is marked as scheduled and saved in a user_table in the Report Scheduler server 260 via the Report Manager. Subsequently, as indicated at step 630, the Report Scheduler server 260 generates an ARD message (Appendix D) and sends the ARD message to StarODS DSS server for which the DSS has a predefined interface, as described herein.

Next, as indicated at step 632, the DSS receives the request and acknowledges receipt. Specifically, when the request is received it is first validated with StarOE to ensure that the user is entitled to receive information about the selected product corp and number(s). Once the request passes validation, the DSS IAIO reads the header to determine which Data Mart will ultimately be queried. It then parses the metadata into a format which the COTS software can readily convert into a SQL statement, as indicated at step 635, FIG. 13(b), and adds the report to the DSS report queue based upon type (Daily, Weekly, Monthly, Adhoc) and associated DataMart, as indicated at step 638. It should be understood that at this point, the request has been flagged as submitted in the RM database, as indicated at step 633.

From this point forward, DSS activity is controlled by a control process and progress or errors are logged internally in the DSS system. This control process includes logic enabling the prioritization of report requests and application of rules defining the order in which they should be executed. Thus, at the appropriate time, depending on the type or report, reporting period and other parameters, the Information Advantage query engine selects the report from the queue, as indicated at step 640, which action is logged in the report status table (Appendix I) as indicated at step 642. The SQL statement is then built by Decision Suite™ and routed to the appropriate data mart for execution in the manner as described herein, as indicated at step 643. The query engine generates the SQL statement from the metadata and executes the report which action is logged in the report status table as indicated at step 645. Next, as indicated at step 648, the query results are returned, and, a post-SQL formatting process is invoked.

Figure 12B:
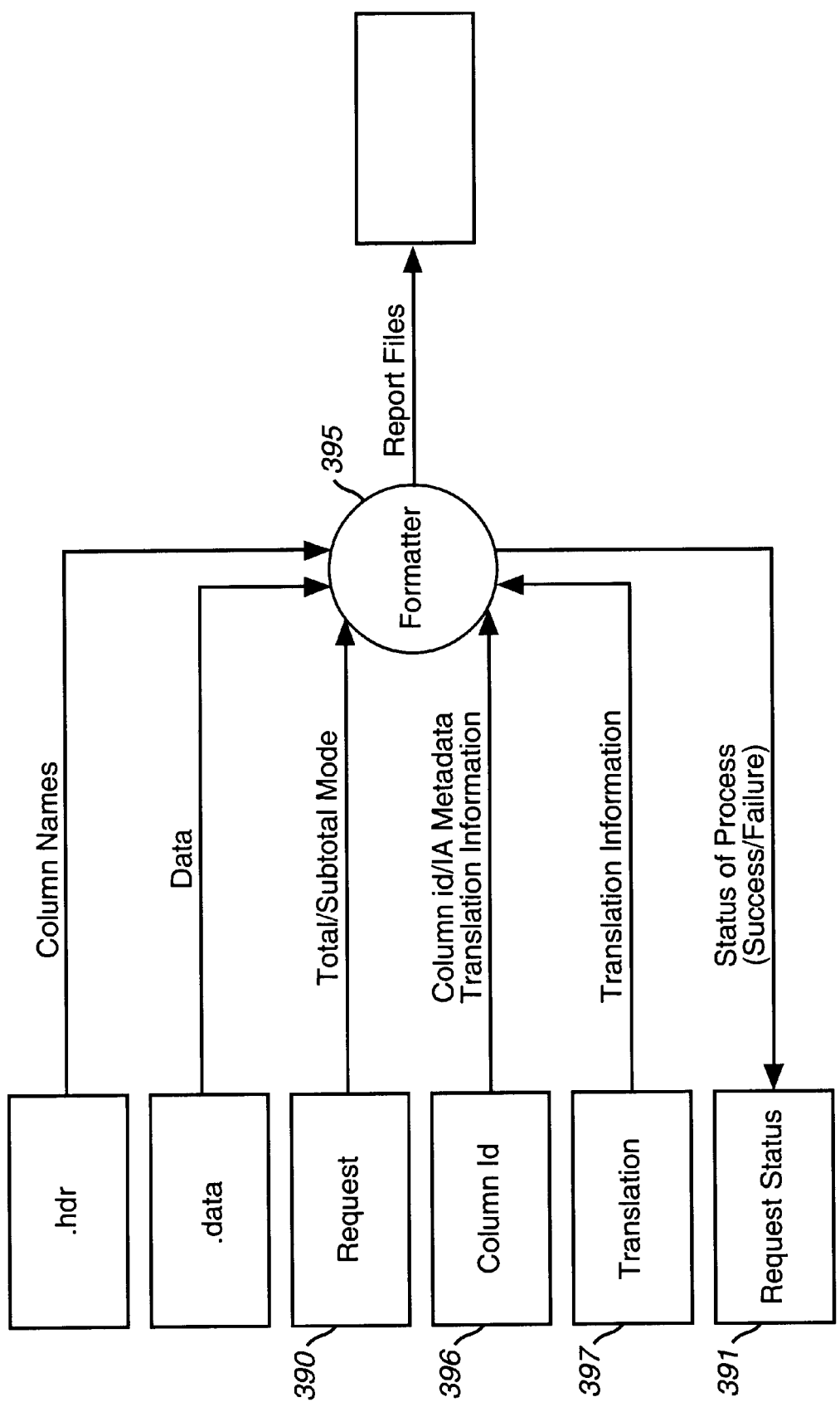
FIG. 12(b) illustrates the formatter process implemented in the DSS server.

More particularly, as shown in FIG. 12(b), a Formatter module 395 may perform various report result transformations including: 1) Converting of column headers generated by Information Advantage® into appropriate column ids that are recognizable to the StarWRS client viewer functionality (as indicated at step 650, FIG. 13(b)); 2) Provide subtotaling for specific requested "subtotal by" columns in the format required by the StarWRS client interface (as indicated at step 653, (FIG. 13(b)) and provides report-based totals as requested by customer; 3) converting binary stream data file to ASCII text file (as indicated at step 655, FIG. 13(c)); 4) implementing Replace logic, e.g., replacement of "TAB" delimiters with appropriate "Comma" field delimiters (as indicated at step 657 FIG. 13(c)); 5) implementing Repeat/Padding logic, i.e., identifying compressed columns/values and decompressing (or repeating) the values that were compressed; 6) providing alphanumeric translations for any encoded data elements returned in the result set data file (as indicated at step 659, FIG. 13(c)); and, 7) adding new computed/derived columns, e.g., percents, averages of column data values, etc., as requested by customers on specific reports.

Particularly, as shown in FIG. 12(b), the Formatter process 395 reads the *.hdr files and *.data files from the Decision Suite™ result set to obtain respective column names and report data. Particularly, the formatter process for converting Column Headers from Information Advantage® column header names to column ids implements a lookup of column ids in a column_id's table, shown in Appendix I, based on column header names.

Then, the formatter process reads the request table 390 for total/subtotal, threshold, etc. information associated with the current report request and determines any other formatting features to be enabled for a particular result set. As shown in the example Request Table of Appendix I, parameters passed to the formatter module indicate any report request specific details that are required by the Formatter. For example, for report totals, a "total_mode" variable is used to indicate if report totals and/or sub-totals should be included. Particularly, Column IDs representing the data columns upon which subtotaling is based are passed as parameters to the Formatter process 395 and are referred to as "Break Columns". At appropriate changes in values for these break columns, the formatter generates a subtotal line for subtotaling the applicable additive facts including, for example, Call Amount, Call Duration, and Call Count.

Furthermore, the formatter reads a Column id table 396 (detailed in Appendix I) to determine data types and if any data translations are needed.

As computed/derived columns may be included or excluded from customer report requests, the Formatter process 395 for calculating new computed/derived columns on specific customer-requested reports are provided on a report request basis. Example types of derived columns include: 1) Percents, e.g., based on the additive data facts pertinent to the report request and are typically based on report totals and row amounts for Call Amount, Call duration, and Call Count; 2) Row-wise derived data elements as requested, which represent data elements computed based on original additive data elements on a row by row basis (i.e., column x/column y for each row in the result data file) and typically include average calculations such as Average # of Minutes per Call, Average Amount per Call, and Average Amount per Minute. Appendix I illustrates a derived column "percent" calculation indicated in the Column ID table showing an equation for calculating a value of a particular value (C36) divided by a column total (CT36)×100.

The Formatter process 395 may additionally perform alphanumeric translations for any encoded data elements returned in the result set data file by implementing appropriate lookup in a Translation table 397, such as the example Translation Table provided in Appendix I, and replacing the code.

Referring back to FIG. 13(c), after formatting the report, as indicated at step 660, a message is sent to the control process to update the request status table 391. It should be understood that, if a failure occurs during formatting, the error log is updated and a status message sent to the request status table 391, as well. Then, as indicated at step 665 (FIG. 13(c) ), the formatter 395 creates a *.csv (Comma Separated Value) or .txt file, gives the file a unique name and saves the file. Preferably, a *.csv is the file generated if the report is successfully generated.

As indicated at step 668, the *.csv report/data file is then "pushed", implementing FTP, to the StarODS server's directory on the Inbox server 270. The StarODS server 400 is responsible for generating unique file names within their directory on the Inbox server 270. For example, the following directory and file naming conventions used for reports generated by the StarODS server are labeled inbox\files\ods with text files having the suffix *.txt or *.txt_zip (compressed), and comma separated files having a suffix *.csv or *.csv_zip (compressed).

Finally, as indicated at step 670, once the file has been successfully transferred to the Priced reporting directory on the Inbox server, and the request status table 391 appropriately updated at step 675, the NRL process (FIG. 11(b)) generates and transmits an NRL message to the RM Server 250 notifying it of the report file name and location in the Inbox, requestor information, and if the transfer was successful. This is accomplished by using a "NRL" metadata message.

Appendix B provides a table comprising the Notify Report Location parameters used for the NRL Metadata messaging sent by StarODS fulfilling server to the RM Server 250 when a requested report is complete. An example NRL message sent from the ODS server 400 to the RM server 250 is as follows:

NRL<TYPE=Sim-Msg-40,ENTPID=00022924, USERID=dorod, STDRPTID=40,USERRPTID=3415, REQUESTID=20341,COMPRESS=0,L OC=/inbox/ files/testODS/STDRPTID43TM_082598_ 084920.CSV, FSIZE=389,PRESORTED=0>

An NRLA response is sent back to the DSS as shown in Appendix B.

Once the RM server 250 has received the NRL message from the fulfilling server, it verifies the file's presence and builds a metadata file, e.g., by compressing the appropriate metadata (for displaying the report) into a .MTD file. This .MTD file is utilized by the Report Viewer to know how to display the report. The Report Manager server creates a file including the metadata using the same file name as the report/data file, but having the following suffix: *.mtd or *.mtd_zip indicating a metadata or compressed metadata file, respectively.

Appendix F details the parameters that are passed in the GET METADATA messaging for indicating to the Report Viewer how to display a requested report. For example, a GET METADATA message corresponding to an Priced TVS fulfilling server report is as follows:

<METADATA=<CRITERIA=<Name= UsageSummary292^ADescription=

This report summarizes calls based on call type.^A Report_Level=<INBOUND<<90000001, 90000001><NA,NA><NA, NA>>INBOUND<<90000002,90000002><,><, >>>^AOptions=^AScheduling _Information=^AOne_ Time=^ADates=<06/01/199800:00/~07/01/1 99800:00, >^ATimezone=EST,Lang=1234,Curr= 2345>DEFAULT_GRAP H_MODE= 0^ADEFAULT_GRAPH_TYPE=0^ADEFINE_X_ AXIS=0^AX_AXIS_COLUMN= ^ADEFAUL T_Y_COLUMNS=<>^A COLUMN_DISPLAY_ ORDER= <105^A114^A67^A62^A36^A61^A58^A63^A6 4^A66^A65>^ASORT_ALLOWED= 1^APRESORTED=0^A

PRESUBTOTALED=1^ATOTALMODE=0^ASORT_ COLUMN S=<105A>^A

SUBTOTAL_COLUMNS=<>^ASELECTED_ SECTION=0^A

METACOLUMN=<META_COLUMN_ID=105^A

COLUMN_LABEL=Usage Description^ADATATYPE= S^ADECIMAL=0^A

HIDEABLE=1^AGRAPHABLE=0^AWIDTH= 20^ACALCULATE=0^A

CALCULATE_EXPRESSION=>^AMETACOLUMN= <META_COLUMN_ID=114^A

COLUMN_LABEL=Range/ DistanceDescription^ADATATYPE=S^ADECIM AL=0^AHIDEABLE=1^AGRAPHABLE=0^AWIDTH= 20^ACALCULATE=0^A

CALCULATE_EXPRESSION=>^AMETACOLUMN= <META_COLUMN_ID=67^A

COLUMN_LABEL=Calls^ADATATYPE= I^ADECIMAL=0^AHIDEABLE=1^A

GRAPHABLE=1^AWIDTH=7^ACALCULATE= 0^ACALCULATE_EXPRESSION=>

^AMETACOLUMN=<META_COLUMN_ID= 62^ACOLUMN_LABEL=% Calls^A

DATATYPE=N^ADECIMAL=1^AHIDEABLE= 1^AGRAPHABLE=1^AWIDTH=7^A

CALCULATE=0^ACALCULATE_EXPRESSION=>^A

METACOLUMN=<META_COLUMN_ID= 36^ACOLUMN_LABEL=Minutes^A

DATATYPE=N^ADECIMAL=1^AHIDEABLE= 1^AGRAPHABLE=1^AWIDTH=8^A

CALCULATE=0^ACALCULATE_EXPRESSION=>^A

METACOLUMN=<META_COLUMN_ID= 61^ACOLUMN_LABEL=% Min^A

DATATYPE=N^ADECIMAL=1^AHIDEABLE= 1^AGRAPHABLE=1^A

WIDTH=5^ACALCULATE=0^ACALCULATE_
EXPRESSION=>^A
METACOLUMN=<META_COLUMN_ID=
58^ACOLUMN_LABEL=Amount^ADATAT
YPE=C^ADECIMAL=2^AHIDEABLE=1^A
GRAPHABLE=1^AWIDTH=7^ACALCULATE=
0^ACALCULATE_EXPRESSION=>
^AMETACOLUMN=<META_COLUMN_ID=
63^ACOLUMN_LABEL=% Amt^A
DATATYPE=N^ADECIMAL=1^AHIDEABLE=
1^AGRAPHABLE=1^AWIDTH=5^A
CALCULATE=0^ACALCULATE_EXPRESSION=>^A
METACOLUMN=<META_COLUMN_ID=
64^ACOLUMN_LABEL=Avg Min/Call
^ADATATYPE=N^ADECIMAL=2^AHIDEABLE=
1^AGRAPHABLE=1^A
WIDTH=12^ACALCULATE=0^ACALCULATE_
EXPRESSION=>^A
METACOLUMN=<META_COLUMN_ID=
66^ACOLUMN_LABEL=Avg
Amt/Call^A
DATATYPE=N^ADECIMAL=2^AHIDEABLE=
1^AGRAPHABLE=1^AWIDTH=12
^ACALCULATE=0^ACALCULATE_EXPRESSION=
>^A
METACOLUMN=<META_COLUMN_ID=
65^ACOLUMN_LABEL=Avg Amt/Min^A
DATATYPE=N^ADECIMAL=2^AHIDEABLE=
1^AGRAPHABLE=1^A
WIDTH=11^ACALCULATE=0^ACALCULATE_
EXPRESSION=>>>
*<METADATA= <CRITERIA= <Name=My Report,
Total=Totals
are located at the bottom of the report.,
Description=My report description,
Number_Dialed=<800#1, 800#2, 800#n>,
Scheduling_Information= Recurring, Dates= Monthly>>
DEFAULT_GRAPH_MODE=1, DEFAULT_
GRAPH_TYPE=1,
DEFINE_X_AXIS=1, X_AXIS_COLUMN=2,
DEFAULT_Y_COLUMNS=<5,6>,
COLUMN_DISPLAY_ORDER=<1,2,3,4,5,6>,
COLUMN_STORED_ORDER=<4,3,2,5,6,1>, SORT_
ALLOWED=1,
PRESORTED = 1, TOTALMODE=3, SUBTOTCOL=<5,
6>, SELECTED
SECTION=1, METACOLUMN=<META_COLUMN_
ID=1,
COLUMN_LABEL=name, DATATYPE=S,
DECIMAL=0, HIDEABLE=1,
GRAPHABLE=0, WIDTH=10, CALCULATE=1,
CALCULATE_EXPRESSION=<4 / 7>>>>

Once the metadata file corresponding to the requested report is build by the Report Manager, the RM ftp's the .MTD file to the Inbox server. The RM server additionally updates a User_report table status field with a status "C" indicating completion.

Once the Report Manager has updated the status field, the RM server 250 then adds the report to the user's Inbox.

Appendix C provides a table showing the fields for the metadata messaging between the RM server 250 and the Inbox server 270 for adding an item into the StarWRS system Inbox server 270, and the respective acknowledgment message format back from the Inbox server. In the "A" message found in Appendix C, the "LOC" field includes information about where the report data is located. For example, a metadata message indicating to the Inbox server that a priced ODS server report is available is shown as:

A<CATEGORY=R,TYPE=traffic,REQUESTID=32197,
USERID=LynneLevy2, RPTID=150, PRIORITY=,
COMPRESS=0,UNOTIFY =O,MMADDR=,
MMTEXT=,PGT=,PGPIN=,PGTXT=,
RPTCATEGORY =Service Location & Hour,
LOC=/inbox/files/ods/902512294STDRPTID10.CSV,
ENTP
ID=10324488,RQSTDT=1998-01-02
15:18,FSIZE=3705,RPTTITLE=Summary by Service
Location and Hour,MSIZE=3322>

Particularly, the RM server supplies a metadata "A" message to the Inbox indicating the FTP file location. Via the report viewer, the report is now available for viewing, downloading, saving, or printing by the user, and as described in further detail in co-pending U.S. patent application Ser. No. 09/159,512, entitled MULTI-THREADED WEB BASED IN-BOX FOR REPORT MANAGEMENT, the contents and disclosure of which are incorporated by reference as if fully set forth herein. Particularly, as shown in the exemplary nMCI home page in FIG. 4, the nMCI Interact Message Center icon 77 may be selected which will cause the display of a web page including the message center dialog window. From the message center dialog window, a user may select from among three tabs, one of which, a reports tab, enables the retrieval of both a data file and a metadata file from the Inbox Server corresponding to those reports that have been run and available for customer viewing. Information provided for display by the message center display 325 is provided by the User_table which keeps track of the status of all reports for a particular user. By double-clicking a chosen report, a report viewer application is enabled to display the chosen report on a web-page. To view the report the user selects the report and, the report metadata and the appropriate viewer are uploaded to the user (client) workstation.

Figure 14:
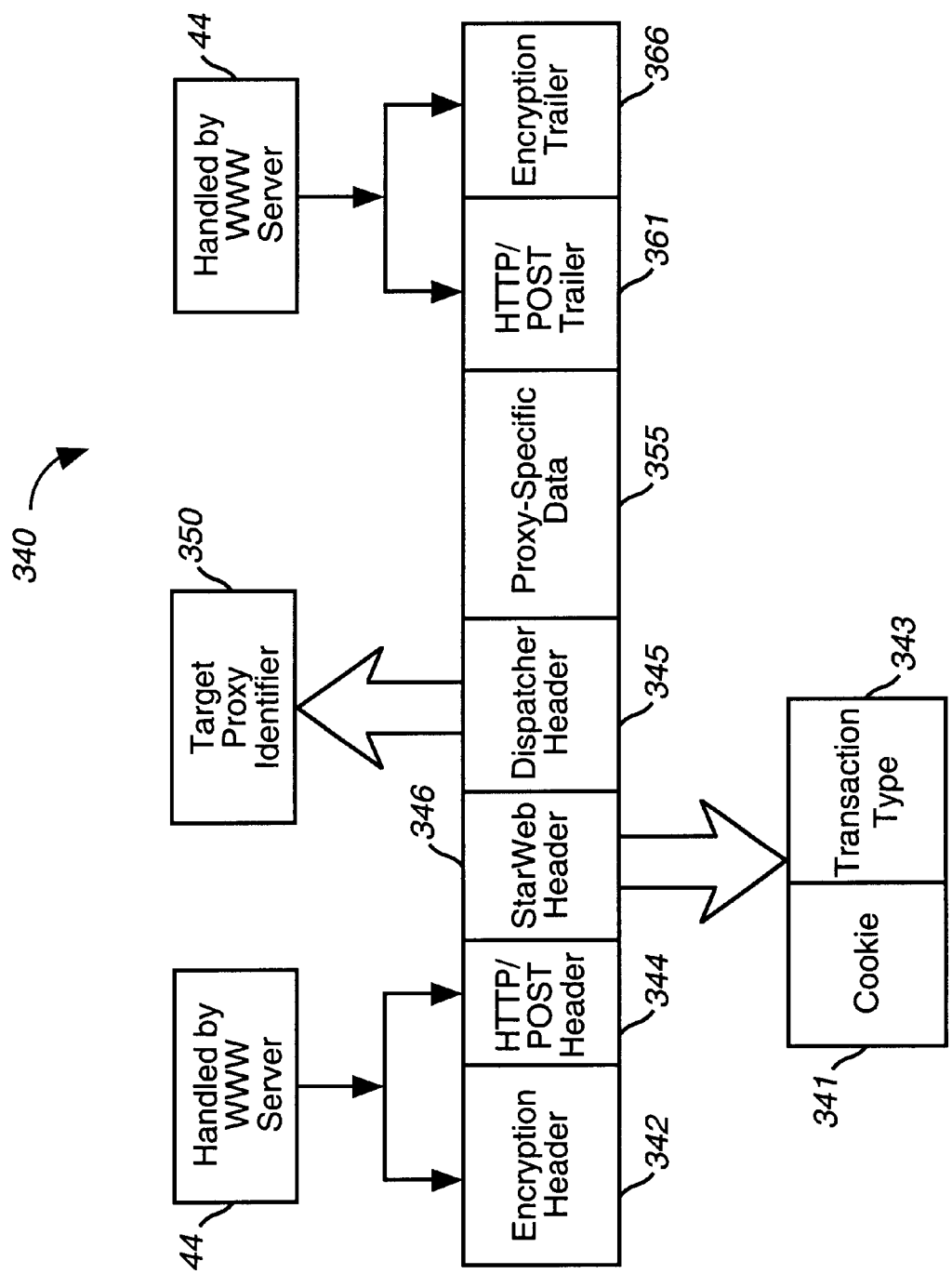
FIG. 14 illustrates a logical message format sent from the client browser to the desired middle tier server for a particular application.

As mentioned herein with respect to FIG. 3, the messages created by the client Java software are transmitted to the StarWeb (DMZ) Server 44 over HTTPS. For incoming (client-to-server) communications, the DMZ Web servers 44 decrypt a request, authenticate and verify the session information. The logical message format from the client to the Web server is shown as follows:

|| TCP/IP || encryption || http || web header || dispatcher
header || proxy-specific data || where "||" separates a logical protocol level, and protocols nested from left to right. FIG. 14 illustrates a specific message sent from the client browser to the desired middle tier server for the particular application. As shown in FIG. 14, the client message 340 includes an SSL encryption header 342 and a network-level protocol HTTP/POST header 344 which are decrypted by the DMZ StarWeb Server(s) 44 to access the underlying message; a DMZ Web header 346 which is used to generate a cookie 341 and transaction type identifier 343 for managing the client/server session; a dispatcher header 345 which includes the target proxy identifier 350 associated with the particular type of transaction requested; proxy specific data 355 including the application specific metadata utilized by the target proxy to form the particular messages for the particular middle tier server providing a service; and, the network-level HTTP/POST trailer 361 and encryption trailer 366 which are also decrypted by the DMZ Web server layer 44.

After establishing that the request has come from a valid user and mapping the request to its associated session, the request is then forwarded through the firewall 55b over a socket connection 33 to one or more decode/dispatch servers 46 located within the corporate Intranet 60. The messaging sent to the Dispatcher will include the user identifier and session information, the target proxy identifier, and the proxy specific data. The decode/dispatch server 46 authenticates the user's access to the desired middle-tier service.

As shown in FIG. 14, the StarWeb server forwards the Dispatcher header and proxy-specific data to the Dispatcher, "enriched" with the identity of the user (and any other session-related information) as provided by the session data/cookie mapping, the target proxy identifier and the proxy-specific data. The dispatch server 46 receives the requests forwarded by the Web server(s) 44 and dispatches them to the appropriate application server proxies. Particularly, as explained generally above with respect to FIG. 7, the dispatch server 46 receives request messages forwarded by the DMZ Web servers and dispatches them to the appropriate server proxies. The message wrappers are examined, revealing the user and the target middle-tier service for the request. A first-level validation is performed, making sure that the user is entitled to communicate with the desired service. The user's entitlements in this regard are fetched by the dispatch server from Order Entry server 280 at logon time and cached. Assuming that the Requestor is authorized to communicate with the target service, the message is then forwarded to the desired service's proxy, which, in the accordance with the principles described herein, comprises: 1) a report manager proxy 250' corresponding to the RM Server 250, 2) a report scheduler proxy 260' corresponding to the RS Server 260, and 3) an inbox server proxy 270' corresponding to the Inbox Server 270. Each of these proxy processes further performs: a validation process for examining incoming requests and confirming that they include validly formatted messages for the service with acceptable parameters; a translation process for translating a message into an underlying message or networking protocol; and, a management process for managing the communication of the specific customer request with the middle-tier server to actually get the request serviced. Data returned from the middle-tier server is translated back to client format, if necessary, and returned to the dispatch server as a response to the request.

Figure 15A:
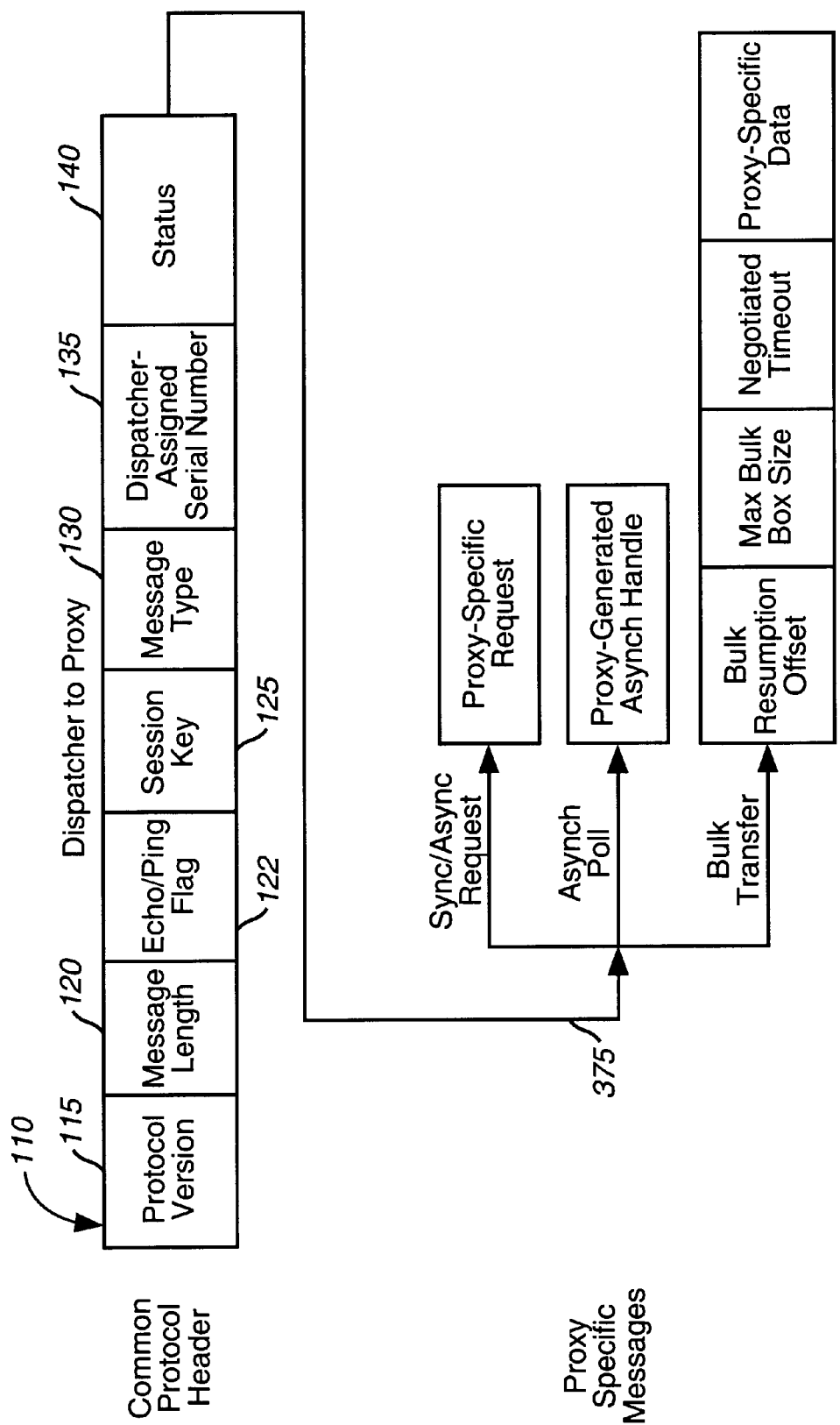
FIGS. 15(a) and 15(b) are schematic illustrations showing the message format passed between the Dispatcher server and the application specific proxy (FIG. 15(a)) and the message format passed between the application specific proxy back to the Dispatcher server (FIG. 15(b)).
Figure 15B:
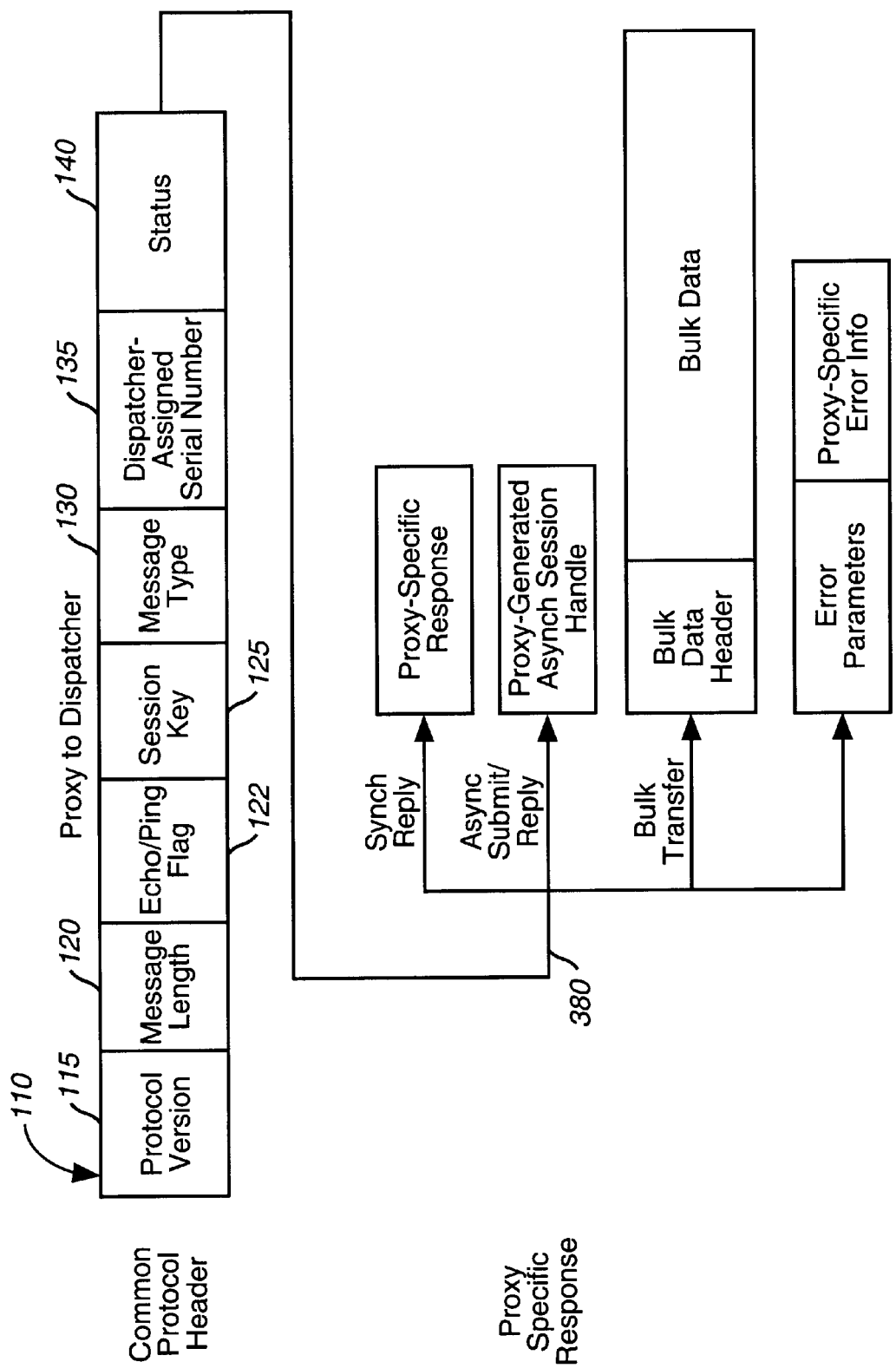

FIGS. 15(a) and 15(b) are schematic illustrations showing the message format passed between the Dispatcher 46 and the application specific proxy (FIG. 15(a)) and the message format passed between the application specific proxy back to the Dispatcher 46 (FIG. 15(b)). As shown in FIG. 15(a), all messages between the Dispatcher and the Proxies, in both directions, begin with a common header 110 to allow leverage of common code for processing the messages. A first portion of the header includes the protocol version 115 which may comprise a byte of data for identifying version control for the protocol, i.e., the message format itself, and is intended to prevent undesired mismatches in versions of the dispatcher and proxies. The next portion includes the message length 120 which, preferably, is a 32-bit integer providing the total length of the message including all headers. Next is the echo/ping flag portion 122 that is intended to support a connectivity test for the dispatcher-proxy connection. For example, when this flag is non-zero, the proxy immediately replies with an echo of the supplied header. There should be no attempt to connect to processes outside the proxy, e.g. the back-end application services. The next portion indicates the Session key 125 which is the unique session key or "cookie" provided by the Web browser and used to uniquely identify the session at the browser. As described above, since the communications middleware is capable of supporting four types of transport mechanisms, the next portion of the common protocol header indicates the message type/mechanism 130 which may be one of four values indicating one of the following four message mechanisms and types: 1)Synchronous transaction, e.g., a binary 0; 2) Asynchronous request, e.g., a binary 1; 3) Asynchronous poll/reply, e.g., a binary 2; 4) bulk transfer, e.g., a binary 3.

Additionally, the common protocol header section includes an indication of dispatcher-assigned serial number 135 that is unique across all dispatcher processes and needs to be coordinated across processes (like the Web cookie (see above)), and, further, is used to allow for failover and process migration and enable multiplexing control between the proxies and dispatcher, if desired. A field 140 indicates the status is unused in the request header but is used in the response header to indicate the success or failure of the requested transaction. More complete error data will be included in the specific error message returned. The status field 140 is included to maintain consistency between requests and replies. As shown in FIG. 16(a), the proxy specific messages 375 are the metadata message requests from the report requestor client and can be transmitted via synchronous, asynchronous or bulk transfer mechanisms. Likewise, the proxy specific responses are metadata response messages 380 again, capable of being transmitted via a synch, asynch or bulk transfer transport mechanism.

It should be understood that the application server proxies can either reside on the dispatch server 46 itself, or, preferably, can be resident on the middle-tier application server, i.e., the dispatcher front end code can locate proxies resident on other servers.

As mentioned, the proxy validation process includes parsing incoming requests, analyzing them, and confirming that they include validly formatted messages for the service with acceptable parameters. If necessary, the message is translated into an underlying message or networking protocol. A list of Report Manager and Inbox proxy error messages can be found in Appendix E. If no errors are found, the proxy then manages the communication with the middle-tier server to actually get the request serviced. The application proxy supports application specific translation and communication with the back-end application server for both the Web Server (java applet originated) messages and application server messages.

Particularly, in performing the verification, translation and communication functions, the Report Manager server, the Report Scheduler server and Inbox server proxies each employ front end proxy C++ objects and components. For instance, a utils.c program and a C++ components library, is provided for implementing general functions/objects. Various C++ parser objects are invoked which are part of an object class used as a repository for the RM metadata and parses the string it receives. The class has a build member function which reads the string which contains the data to store. After a message is received, the parser object is created in the RMDispatcher.c object which is file containing the business logic for handling metadata messages at the back-end. It uses the services of an RMParser class. Upon determining that the client has sent a valid message, the appropriate member function is invoked to service the request. Invocation occurs in MCIRMServerSocket.C when an incoming message is received and is determined not to be a talarian message. RMSErverSocket.c is a class implementing the message management feature in the Report Manager server. Public inheritance is from MCIServerSocket in order to create a specific instance of this object. This object is created in the main loop and is called when a message needs to be sent and received; a Socket.c class implementing client type sockets under Unix using, e.g., TCP/IP or TCP/UDP. Socket.C is inherited by ClientSocket.C:: Socket (theSocketType, thePortNum) and ServerSocket.C:: Socket (theSocketType, thePortNum) when ClientSocket or ServerSocket is created. A ServerSocket.c class implements client type sockets under Unix using either TCP/IP or TCP/UDP. ServerSocket.C is inherited by RMServerSocket when RMServerSocket is created. An InboxParser.c class used as a repository for the RM Metadata. The class' "build" member function reads the string which contains the data to store and the class parses the string it receives. After a message has been received, the MCIInboxParser object is created in inboxutl.c which is a file containing the functions which process the Inbox requests, i.e, Delete, List, Fetch and Update (Appendix G). Additional objects/classes include: Environ.c which provides access to a UNIX environment; Process.c which provides a mechanism to spawn slave processes in the UNIX environment; Daemon.c for enabling a process to become a daemon; Exception.c for exception handling in C++ programs; and, RMlog.c for facilitating RM logging. In addition custom ESQL code for RM/database interface is provided which includes the ESQC C interface (Informix) stored procedures for performing the ARD, DRD, DUR, URS, GRD, CRD, and GPL messages. The functions call the stored procedures according to the message, and the response is build inside the functions depending on the returned values of the stored procedures. A mainsql.c program provides the ESQL C interface for messages from the report manager and report viewer.

A list of Report Manager and Inbox proxy error messages can be found in Appendix E.

Outgoing (server-to-client) communications follow the reverse route, i.e., the proxies will feed responses to the decode/dispatch server, which will encrypt the client-bound messages and communicate them to the DMZ Web servers over the socket connection. The Web servers will forward the information to the client using SSL. The logical message format returned to the client from the middle tier service is shown as follows:

|| TCP/IP || encryption || http || web response || dispatcher response || proxy-specific response || where || separates a logical protocol level, and protocols nested from left to right.

The foregoing merely illustrates the principles of the present invention. Those skilled in the art will be able to devise various modifications, which although not explicitly described or shown herein, embody the principles of the invention and are thus within its spirit and scope.

What is claimed is:

1. A Web/Internet based reporting system for communicating data information from an enterprise intranet database to a client workstation via an integrated interface, said system comprising:

client browser application located at said client workstation for enabling interactive Web based communications with said reporting system, said client workstation identified with a customer and providing said integrated interface;

at least one secure server for managing client sessions over the Internet, said secure server supporting a first secure socket connection over a first firewall enabling encrypted communication between said client browser application and said secure server;

report manager server for maintaining an inventory of reporting items associated with a customer and managing the reporting of customer-specific data information in accordance with a customer report request message, said report manager generating a response message including a metadata description of said reporting items included in a report request;

dispatch server for communicating with said secure server through a second firewall over a second socket connection, said first secure and second socket connections forming a secure communications link, said dispatch server enabling forwarding of a report request message to said report manager server; and operational data storage device for receiving a metadata description of a requested report from said report manager server and retrieving said customer-specific data from said enterprise intranet database in accordance with said received metadata description;

wherein said retrieved data and said metadata description of said reporting items are utilized to generate a completed report for presentation to said customer via said interface.

2. The reporting system as claimed in claim 1, further including client report requester application for enabling presentation of a report request menu including various reporting options for said customer in accordance with predetermined customer entitlements, said reporting options including creation and customization of said reporting items.

3. A Web/Internet based reporting system for communicating data information from an enterprise intranet database to a client workstation via an integrated interface, said system comprising:

client browser application located at said client workstation for enabling interactive Web based communications with said reporting system, said client workstation identified with a customer and providing said integrated interface;

at least one secure server for managing client sessions over the Internet, said secure server supporting a first secure socket connection over a first firewall enabling encrypted communication between said client browser application and said secure server;

report manager server for maintaining an inventory of reporting items associated with a customer and managing the reporting of customer-specific data information in accordance with a customer report request message, said report manager generating a response message including a metadata description of said reporting items included in a report request;

dispatch server for communicating with said secure server through a second firewall over a second socket connection, said first secure and second socket connections forming a secure communications link, said dispatch server enabling forwarding of a report request message to said report manager server; and operational data storage device for receiving a metadata description of a requested report from said report manager server and retrieving said customer-specific data from said enterprise intranet database in accordance with said received metadata description;

client report requestor application for enabling presentation of a report request menu including various reporting options for said customer in accordance with predetermined customer entitlements, said reporting options including creation and customization of said reporting items; and report scheduler server for enabling said operational data storage device to retrieve said customer-specific data at predetermined times in accordance with a reporting schedule, wherein said retrieved data and said metadata description of said reporting items are utilized to generate a completed report for presentation to said customer via said interface.

4. The reporting system as claimed in claim 3, wherein said client report requestor application further generates said report request message in response to user selection of a specific report option for communication over said secure communications link, for receipt by said report manager server.

5. The reporting system as claimed in claim 3, wherein said second operational data storage device for accessing customer-specific data includes a mechanism for formatting said customer-specific data information in accordance with said metadata description, said customer-specific data being formatted for display at said client workstation via said integrated interface.

6. The reporting system as claimed in claim 3, wherein said scheduler server enables said operational data storage device to retrieve said customer-specific data at a customer-specified frequency.

7. The reporting system as claimed in claim 6, wherein said report manager server includes a process for generating requestor applets for communication over said secure communications link to said client workstation, one of said applets capable of presenting said reporting items to a requesting customer via said interface.

8. The reporting system as claimed in claim 3, wherein said customer specific data information relates to priced call detail data representing usage of a customer's telecommunications network.

9. The reporting system as claimed in claim 3, wherein said enterprise intranet database is organized as one or more datamart storage devices, said operational data storage device determining one or more specific datamart storage devices from which o access said customer-specific data information in accordance with a report metadata description.

10. The reporting system as claimed in claim 9, further including a data harvester device for periodically inputting up-to-date data information into said one or more datamart storage devices.

11. The reporting system as claimed in claim 10, wherein said one or more datamart storage devices is organized according to a star-schema topology to facilitate retrieval of customer-specific data therefrom.

12. The reporting system as claimed in claim 3, further including subscribe and publish communications interface between said report manager server and said operational data storage device, said metadata descriptions being translated by said report manager server to generate published messages for receipt by said operational data storage device.

13. The reporting system as claimed in claim 3, further including a client report viewer application for receiving said customer specific data of a requested report and a metadata description of a report type and generating said report for display at said interface.

14. A method for reporting data information from an enterprise intranet database to a client terminal via an integrated interface, said method comprising:

enabling interactive Web based communications between said client terminal identified with a customer and a first secure server over a first secure socket connection over a first firewall, said socket connection enabling encrypted communication between said browser application client and said secure server;

enabling communications between said secure server and a second server through a second firewall over a second socket connection, said first and second sockets forming a secure communications link, said second server enabling forwarding of a report request message and an associated report response message back to said client browser over said secure conmmunications link;

accessing reporting items based on a customer identity and report name from a first database, and generating a response message including a metadata description of said reporting items;

retrieving said customer-specific data from said enterprise intranet database in accordance with said metadata description; and generating a completed report for said customer from said metadata description of said reporting items and said accessed customer-specific data via said interface.

15. The method as claimed in claim 14, further including the step of presenting a report request menu including various reporting options for said customer in accordance with predetermined customer entitlements, said reporting options including creation and customization of said reporting items.

16. The method as claimed in claim 15, further including the step of enabling retrieval of said customer-specific data at a predetermined time in accordance with a reporting item.

17. A method for reporting data information from an enterprise intranet database to a client terminal via an integrated interface, said method comprising:

enabling interactive Web based communications between said client terminal identified with a customer and a first secure server over a first secure socket connection, said socket connection enabling encrypted communication between said browser application client and said secure server;

enabling communications between said secure server and a second server over a second socket connection, said first and second sockets forming a secure communications link, said second server enabling forwarding of a report request message and an associated report response message back to said client browser over said secure communications link; accessing reporting items based on a customer identity and report name from a first database, and generating a response message including a metadata description of said reporting items; retrieving said customer-specific data from said enterprise intranet database in accordance with said metadata description;

generating a completed report for said customer from said metadata description of said reporting items and said accessed customer-specific data via said interface;

presenting a report request menu including various reporting options for said customer in accordance with predetermined customer entitlements, said reporting options including creation and customization of said reporting items; and periodically enabling retrieval of said customer-specific data.

18. The method as claimed in claim 17, further including the step of generating said report request message in response to user selection of a specific report option for communication over said secure communications link, and communicating a response message over said communications link for display at said client terminal.

19. The method as claimed in claim 17, wherein said step of accessing customer-specific data includes the step of formatting said customer-specific data information in accordance with said metadata description, and storing said customer-specific data information in a database.

20. The method as claimed in claim 16, further including generating requester applets for communication over said secure communications link to said client terminal, said applet presenting said reporting items to a requesting customer via said interface.

21. The method as claimed in claim 17, wherein said enterprise intranet database is organized as one or more datamarts, said method including determining one or more specific datamarts from which to access said customer-specific data information.

* * * * *